(12) United States Patent
Watanabe et al.

(10) Patent No.: US 7,599,521 B2
(45) Date of Patent: Oct. 6, 2009

(54) VEHICLE VICINITY MONITORING APPARATUS

(75) Inventors: Masahito Watanabe, Utsunomiya (JP); Masakazu Saka, Utsunomiya (JP); Nobuharu Nagaoka, Nasukarasuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 693 days.

(21) Appl. No.: 11/287,555

(22) Filed: Nov. 23, 2005

(65) Prior Publication Data
US 2006/0204037 A1 Sep. 14, 2006

(30) Foreign Application Priority Data

Nov. 30, 2004 (JP) ............................. 2004-347813
Nov. 30, 2004 (JP) ............................. 2004-347819

(51) Int. Cl.
*G06K 9/00* (2006.01)
*H04N 7/18* (2006.01)
*G05D 1/00* (2006.01)

(52) U.S. Cl. ........................... 382/104; 348/149; 701/1
(58) Field of Classification Search ................ 382/103, 382/104, 106, 107, 190, 209; 340/3.1, 3.9, 340/435, 573.3, 901–904, 932, 933, 935, 340/938, 988, 991, 995, 995.17; 701/1, 49, 701/53, 300; 348/113, 120, 148, 149, 169
See application file for complete search history.

(56) References Cited

U.S. PATENT DOCUMENTS

| 6,014,608 | A | 1/2000 | Seo |
| 6,265,991 | B1 * | 7/2001 | Nishiwaki et al. ........... 340/903 |
| 6,327,536 | B1 * | 12/2001 | Tsuji et al. .................. 701/301 |
| 6,373,518 | B1 | 4/2002 | Sogawa |
| 6,385,334 | B1 | 5/2002 | Saneyoshi et al. |
| 6,385,536 | B2 * | 5/2002 | Kimura ....................... 701/209 |
| 6,531,959 | B1 | 3/2003 | Nagaoka et al. |
| 6,546,115 | B1 * | 4/2003 | Ito et al. ...................... 382/100 |
| 6,594,600 | B1 * | 7/2003 | Arnoul et al. ................. 702/94 |
| 6,658,150 | B2 | 12/2003 | Tsuji et al. |
| 6,683,969 | B1 * | 1/2004 | Nishigaki et al. ............ 382/104 |
| 6,690,011 | B2 | 2/2004 | Watanabe et al. |
| 6,785,403 | B1 * | 8/2004 | Murakami et al. ........... 382/104 |
| 6,956,503 | B2 * | 10/2005 | Yokokohji et al. ........... 340/988 |
| 7,130,448 | B2 | 10/2006 | Nagaoka et al. |
| 7,141,796 | B2 | 11/2006 | Hattori et al. |
| 7,233,233 | B2 | 6/2007 | Taniguchi et al. |

(Continued)

FOREIGN PATENT DOCUMENTS

DE 100 33 599 A1 2/2001

(Continued)

*Primary Examiner*—Abolfazl Tabatabai
(74) *Attorney, Agent, or Firm*—Carrier, Blackman & Associates, P.C.; Joseph P. Carrier; William D. Blackman

(57) ABSTRACT

A right infrared camera produces a right gray-scale image by imaging aiming targets disposed in a right position, and a left infrared camera produces a left gray-scale image by imaging aiming targets disposed in a left position. An average value of coordinates of the aiming targets in a preset clipping area is determined, and an average value of coordinates of the aiming targets in a preset clipping area is determined. A difference between the average value and the average value is determined, and the clipping area is moved depending on the difference.

9 Claims, 29 Drawing Sheets

U.S. PATENT DOCUMENTS

| | | |
|---|---|---|
| 2001/0002936 A1 | 6/2001 | Tsuji et al. |
| 2003/0007074 A1 | 1/2003 | Nagaoka et al. |
| 2003/0169917 A1 | 9/2003 | Ishiyama |
| 2003/0169918 A1 | 9/2003 | Sogawa |
| 2004/0066965 A1 | 4/2004 | Watanabe et al. |
| 2004/0183906 A1 | 9/2004 | Nagaoka et al. |
| 2005/0063565 A1 | 3/2005 | Nagaoka et al. |
| 2005/0276450 A1 | 12/2005 | Taniguchi et al. |

FOREIGN PATENT DOCUMENTS

| | | |
|---|---|---|
| DE | 102 28 638 A1 | 1/2003 |
| DE | 102 47 371 A1 | 7/2003 |
| DE | 103 01 469 A1 | 9/2003 |
| DE | 103 01 468 A1 | 10/2003 |
| DE | 10 2004 012 811 A1 | 11/2004 |
| DE | 10 2004 041 919 A1 | 4/2005 |
| DE | 10 2005 026 875 A1 | 1/2006 |
| DE | 10 2005 026 876 A1 | 6/2006 |
| EP | 1 089 054 A2 | 4/2001 |
| EP | 1 245 443 A2 | 10/2002 |
| FR | 97 13375 | 10/1997 |
| JP | 01-273113 | 11/1989 |
| JP | 06-253204 | 9/1994 |
| JP | 08-086613 | 4/1996 |
| JP | 08-210816 | 8/1996 |
| JP | 08-276787 | 10/1996 |
| JP | 08-293029 | 11/1996 |
| JP | 10-115518 | 5/1998 |
| JP | 10-341458 | 12/1998 |
| JP | 11-083475 | 3/1999 |
| JP | 11-083530 | 3/1999 |
| JP | 11-259632 | 9/1999 |
| JP | 11-325889 | 11/1999 |
| JP | 2000-003448 | 1/2000 |
| JP | 2001-91984 | 4/2001 |
| JP | 2001-506369 | 5/2001 |
| JP | 2001-160144 | 6/2001 |
| JP | 2001-211449 | 8/2001 |
| JP | 2002-005626 | 8/2001 |
| JP | 2001-272210 | 10/2001 |
| JP | 2001-289654 | 10/2001 |
| JP | 2001-351193 | 12/2001 |
| JP | 2002-290234 | 1/2002 |
| JP | 2002-003656 | 2/2002 |
| JP | 2002-250770 | 9/2002 |
| JP | 2003-141520 | 5/2003 |
| JP | 2003-216937 | 7/2003 |
| JP | 3515926 | 1/2004 |
| JP | 2004-128887 | 4/2004 |
| JP | 2004-132870 | 4/2004 |
| JP | 2004-239791 | 8/2004 |

* cited by examiner

VEHICLE VICINITY MONITORING APPARATUS

BACKGROUND OF THE INVENTION

1. Field of the Invention

The present invention relates to a vehicle vicinity monitoring apparatus for extracting an object from an image obtained by an imaging unit that is capable of obtaining images in a visible light range or an infrared radiation range.

2. Description of the Related Art

There has been developed a vehicle vicinity monitoring apparatus for obtaining images of one object with two imaging units mounted on a vehicle, for example, either measuring the distance up to the object based on the parallax between the obtained images, or measuring the position in an actual space of the object with respect to the vehicle, and informing the driver of whether there is an obstacle ahead of the vehicle or not (see Japanese Laid-Open Patent Publication No. 2003-216937).

According to the developed vehicle vicinity monitoring apparatus, after the object is detected in the two images obtained by the imaging units, the parallax between the obtained images with respect to the object is determined by pattern matching, and the distance up to the object is detected based on the parallax.

In order to accurately measure the position of or the distance up to the object, the angles at which the imaging units are mounted need to be determined with accuracy. Particularly, if the object exists in a distant position, then any slight difference between the mounted angles of the imaging units tends to cause a large error in the measurement of the position of or the distance up to the object. One solution is to perform an aiming process in which a target placed in a known position is imaged by the imaging units, and the mounted angles of the imaging units are determined based on the target images in the obtained images.

According to the aiming process, suitable clipping areas (image areas) are set respectively in the two images. Then, the object is extracted from the images of the clipping areas, and pattern matching and parallax detection are performed according to correlative calculations to calculate the distance up to the object. The clipping areas that are set respectively in the two images are calculated from known parameters such as the height of the imaging unit, the height of the object, etc., and can be set independently of each other.

Actually, however, the two imaging units may have slightly different heights and orientations due to a small distortion of the vehicle itself and manufacturing errors of supports of the imaging units. Therefore, the clipping areas that are independently set in the images obtained by the imaging units may not exactly match each other. According to a pattern matching process, the object image is extracted from one of the two images as a reference image, and moved the extracted image over the other image as a comparison image. If the clipping areas do not exactly match each other in the pattern matching process, then a period of time for seeking a pattern match is increased, or the object image may match another object image.

There is known a position detecting apparatus for extracting an object from an image obtained by an imaging unit mounted on a vehicle and detecting the position of the object in an actual space, while at the same time performing a correcting process for removing the effect of pitching of the vehicle (see, for example, Japanese Laid-Open Patent Publication No. 2002-5626).

There is also known a position detecting apparatus for extracting an object from an image obtained by an imaging unit mounted on a vehicle and detecting the position of the object in an actual space, while at the same time performing a correcting process for removing the effect of a lateral shift of the optical axis of the imaging unit (see, for example, Japanese Laid-Open Patent Publication No. 2002-5656).

In the known position detecting apparatus, as corrective quantities relative to a pitch angle and a pan angle with respect to the initially set optical axis of the imaging unit mounted on the vehicle increase, an image area to be processed which is set depending on an image area determined by the initially set optical axis and an object search area is liable to be shifted excessively, making it difficult to appropriately perform a process of detecting the object in a desired monitoring area around the vehicle.

SUMMARY OF THE INVENTION

It is an object of the present invention to provide a vehicle vicinity monitoring apparatus which is capable of appropriately performing a process of detecting an object in a desired monitoring area around a vehicle.

Another object of the present invention is to provide a vehicle vicinity monitoring apparatus which is capable of quickly and accurately performing a pattern matching process for setting suitable clipping areas respectively in first and second images and determining a parallax with respect to an object from the clipping areas.

According to the present invention, there is provided a vehicle vicinity monitoring apparatus for extracting an object in the vicinity of a vehicle from images obtained by a plurality of imaging units mounted on the vehicle, comprising an image area setting unit for setting an image area used to detect an object therefrom in each of the images obtained by the imaging units, an object extracting unit for detecting an object in the image area set by the image area setting unit, and an image area correcting unit for correcting the image area set by the image area setting unit based on information with respect to the object detected by the object extracting unit.

With this arrangement, an image area is set based on an actually extracted object, and then corrected by the image area correcting unit based on information with respect to the object. Therefore, a process of detecting an object in a desired monitoring area around the vehicle can appropriately be carried out.

The object extracting unit may detect an object in each of image areas set by the image area setting unit. The image areas can be related to each other for alignment. Therefore, in a pattern matching process for removing the image of the object extracted from either one of the image areas and moving the removed image in the other image area, the period of time required to achieve a pattern match is reduced almost without any possibility for the image to match another object. Therefore, the pattern matching process can quickly and reliably be performed.

The imaging units may comprise a first imaging unit for obtaining a first image of the object and a second imaging unit for obtaining a second image of the object. The object extracting unit may extract the object from each of the first image and the second images, and the image area setting unit may set a first image area and a second image area respectively in the first image and the second image as areas for detecting the object obtained by the first imaging unit and the second imaging unit according to a pattern matching process, and may set the first image area and the second image area based on the position of the object extracted by the object extracting unit so as to equalize coordinates of the object in a direction perpendicular to a hypothetical plane including optical axes of the first imaging unit and the second imaging unit.

Since the first image area and the second image area are set based on the actually extracted object, the first image area and the second image area can be related to each other for alignment. Therefore, in a pattern matching process for removing the image of the object extracted from either one of the first and second image areas and moving the removed image in the other image area, the period of time required to achieve a pattern match is reduced almost without any possibility for the image to match another object. Therefore, the pattern matching process can quickly and reliably be performed.

The imaging units may comprise at least three imaging units, one of the imaging units serving as the first imaging unit, and the remaining imaging units as the second imaging units.

The first imaging unit may obtain a first target as the first image of the object and the second imaging unit may obtain a second target as the second image of the object at the same height as the first target, and the image area setting unit may set the first image area and the second image area based on the difference between coordinates, in the direction perpendicular to the hypothetical plane, of the first target as the first image and the second target as the second image. Because the difference in the direction perpendicular to the hypothetical plane between the images of the first and second targets that are positioned at the same height is used, the first image area and the second image area can be set quickly and simply. The first target and the second target may be the same target.

The vehicle vicinity monitoring apparatus may further comprise an optical axis shift detecting unit for detecting a shift of optical axes of the imaging units, and mounted state detecting unit for detecting mounted states of the imaging units on the vehicle, and the image area correcting unit may correct the image area set by the image area setting unit based on the shift of the optical axes detected by the optical axis shift detecting unit and the mounted states detected by the mounted state detecting unit.

Since the image area correcting unit corrects the image area set by the image area setting unit based on the shift of the optical axes detected by the optical axis shift detecting unit and the mounted states detected by the mounted state detecting unit, the image area can appropriately be set depending on the correction of the optical axes of the imaging units, and the object can properly be detected in a desired monitoring area around the vehicle The vehicle vicinity monitoring apparatus may further comprise an image guarantee area determining unit for determining whether the image area corrected by the image area correcting unit exceeds a predetermined image guarantee area of the imaging units or not, and an informing unit for outputting an alarm if it is judged by the image guarantee area determining unit that the image area corrected by the image area correcting unit exceeds the predetermined image guarantee area.

If the corrective quantity for the image area is so excessive that the image area exceeds the image guarantee area, making the data in the image area much less reliable, then an alarm may be issued. Consequently, the occupants of the vehicle or the operator engaging in an aiming process is able to recognize the reliability of the data produced by an object detecting process.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A vehicle vicinity monitoring apparatus according to an embodiment of the present invention will be described below with reference to FIGS. 1 through 29.

Figure 1:
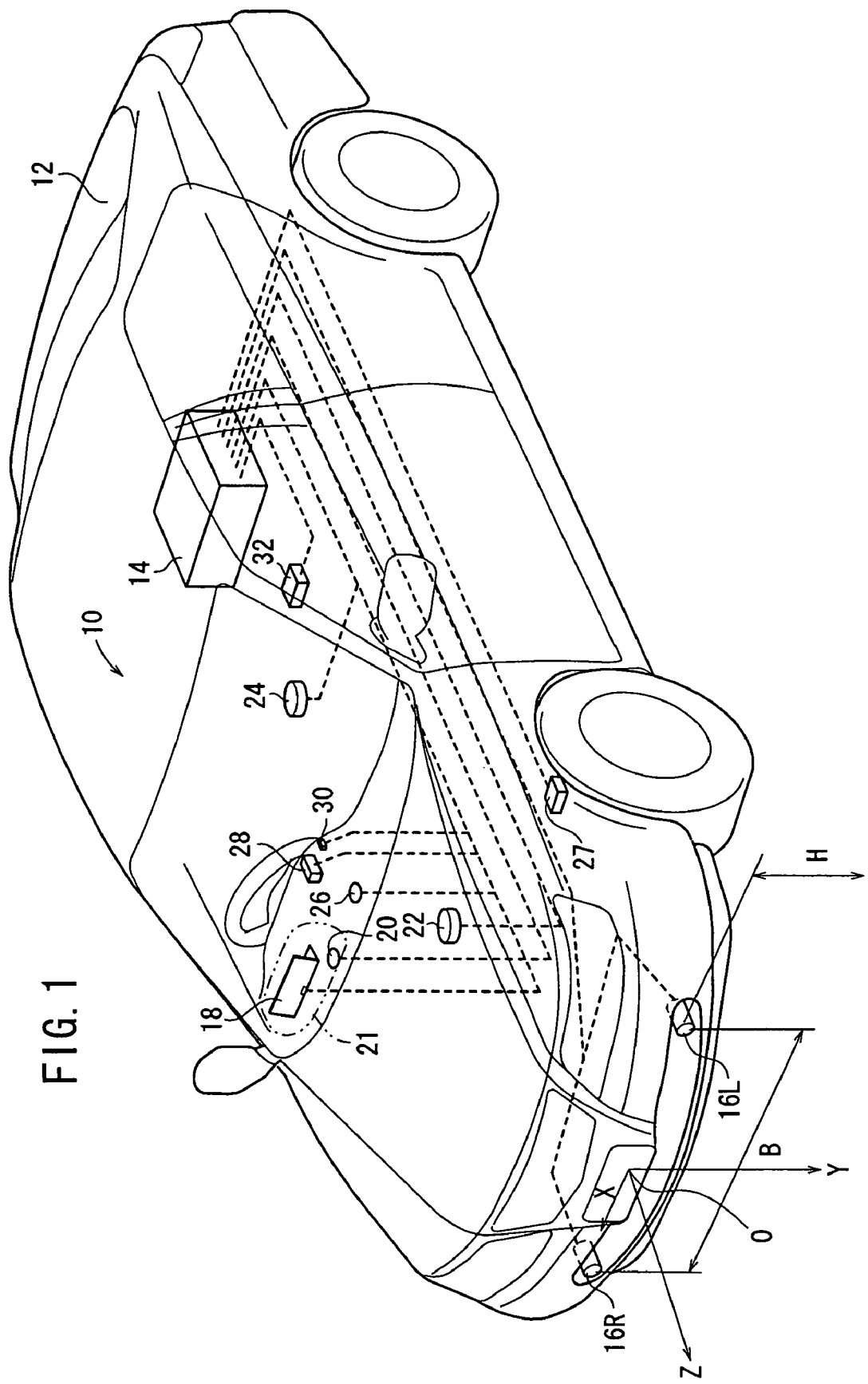
FIG. 1 is a schematic perspective view of a night vision system installed on a vehicle which incorporates a vehicle vicinity monitoring apparatus according to an embodiment of the present invention.

As shown in FIG. 1, a night vision system (vehicle vicinity monitoring apparatus) 10 according to an embodiment of the present invention is installed on a vehicle 12. The night vision system 10 has an ECU (Electronic Control Unit) 14 serving as a main controller, a left infrared camera 16L (a first imaging unit, hereinafter also referred to as slave camera 16L), a right infrared camera 16R (a second imaging unit, hereinafter also referred to as master camera 16R), an HUD (Head-Up Display) 18 for displaying a detected image, a speaker 20 for outputting an alarm sound, a speed sensor 22 for detecting a running speed, a yaw rate sensor 24 for detecting a yaw rate of the vehicle 12 when the vehicle 12 is driven, a solar radiation sensor 26, a brake sensor 27 for detecting whether the driver of the vehicle 12 has braked the vehicle 12 or not, a headlight switch 28, a main switch 30 for selectively activating and inactivating the night vision system 10, and a connector 32 for connecting the night vision system 10 to an external computer system. The HUD 18 and the speaker 20 act as an informing device 21 for providing certain information to vehicle occupants. These components of the night vision system 10 may be connected to each other by intravehicular communication lines that are used by other systems on the vehicle 12.

The infrared cameras 16R, 16L are mounted respectively in the right and left ends of a horizontal grill hole defined in a lower bumper region. The infrared cameras 16R, 16L are oriented forwardly at respective symmetrical positions and horizontally spaced from each other by an inter-camera distance (also referred to as "base length") B. Each of the infrared cameras 16R, 16L detects far-infrared radiation to obtain an infrared image in which higher-temperature areas represent higher luminance, and supplies the obtained image to the ECU 14.

The HUD 18 is disposed on an upper surface of an instrumental panel at a position directly in front of the driver seated on a driver's seat of the vehicle 12, while trying not to obstruct the front vision of the driver. When the night vision system 10 is turned off, the HUD 18 is retracted down in the instrumental panel. If it is judged that the present time is nighttime based on information from the solar radiation sensor 26 and also that the headlights (or fog lamps) are turned on based on information from the headlight switch 28, then the HUD 18 pops up from the instrumental panel when the main switch 30 is turned on. The HUD 18 has an image display panel comprising a concave mirror for reflecting and projecting an image sent from within the instrumental panel. The night vision system 10 may be automatically activated by an automatic lighting function regardless of whether the main switch 30 is operated or not. The luminance of the image display panel of the HUD 18 may be made adjustable by a suitable switch.

The ECU 14 processes stereographic infrared images obtained by the infrared cameras 16R, 16L to detect heat-source objects based on the parallax between the infrared images, and displays the detected heat-source objects as white silhouettes on the HUD 18. When the ECU 14 identifies a pedestrian among the heat-source objects, the ECU 14 controls the speaker 20 to output an alarm sound and also controls the HUD 18 to highlight the identified pedestrian with a surrounding frame having a striking color for thereby drawing the driver's attention. The ECU 14 performs such an attention drawing function (or an informing function) at such good timing to allow the driver to take a sufficient danger avoiding action, by predicting a period of time until the vehicle 12 reaches the position of the pedestrian in a predetermined speed range.

In order for the infrared cameras 16R, 16L to be able to accurately determine the positions, distances, and shapes of far heat-source objects, the infrared cameras 16R, 16L are subject to an adjustment process called an aiming process (which will be described later) when they are manufactured in the manufacturing plant or when they are inspected at regular intervals.

Figure 2:
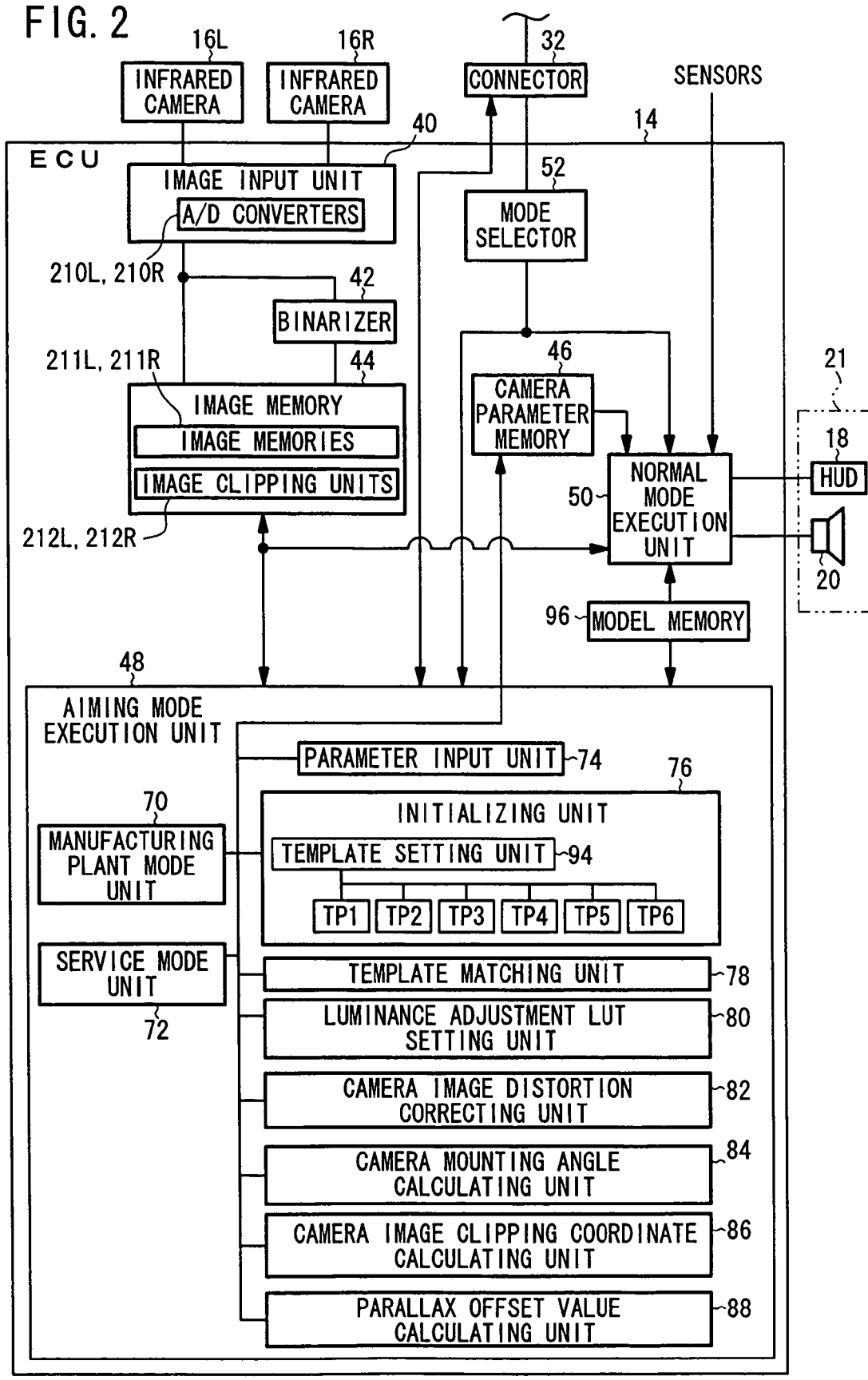
FIG. 2 is a functional block diagram of an ECU of the night vision system shown in FIG. 1.

As shown in FIG. 2, the ECU 14 comprises an image input unit 40 for converting analog infrared images obtained by the respective infrared cameras 16R, 16L into digital gray-scale images, a binarizer 42 for generating binary images from the gray-scale images based on a threshold value, an image memory 44 for storing the binary images and the gray-scale images, an aiming mode execution unit 48 for storing camera parameters produced as a result of the aiming process into a camera parameter memory 46, a normal mode execution unit 50 for performing a normal image processing process while referring to sensors including the speed sensor 22, etc. and the camera parameter memory 46, and controlling the HUD 18 and the speaker 20, and a mode selector 52 for selecting either an aiming mode or a normal mode at a time based on an instruction transmitted from an external computer system through the connector 32.

The image input unit 40 has A/D converters 210R, 210L for converting analog infrared image signals received from the infrared cameras 16R, 16L into digital image signals. The image memory 44 has image memories 211R, 211L for storing digital image signals produced by the A/D converters 210R, 210L, and image clipping units 212L, 212R to be described later.

The ECU 14 has a CPU (Central Processing Unit) for performing various arithmetic and processing operations, a RAM (Random Access Memory) for storing data processed by the CPU, a ROM (Read Only Memory) for storing programs executed by the CPU, tables, maps, etc., and an output circuit for outputting a drive signal for the speaker 20, a display signal for the HUD 18, etc., and other signals. Signals that are output from the infrared cameras 16R, 16L and various sensors are converted into digital signals, which are then supplied to the CPU. The functions of the ECU 14 are implemented in software when the CPU reads programs from the ROM, etc. and executes the programs in cooperation with the RAM. etc.

Figure 3:
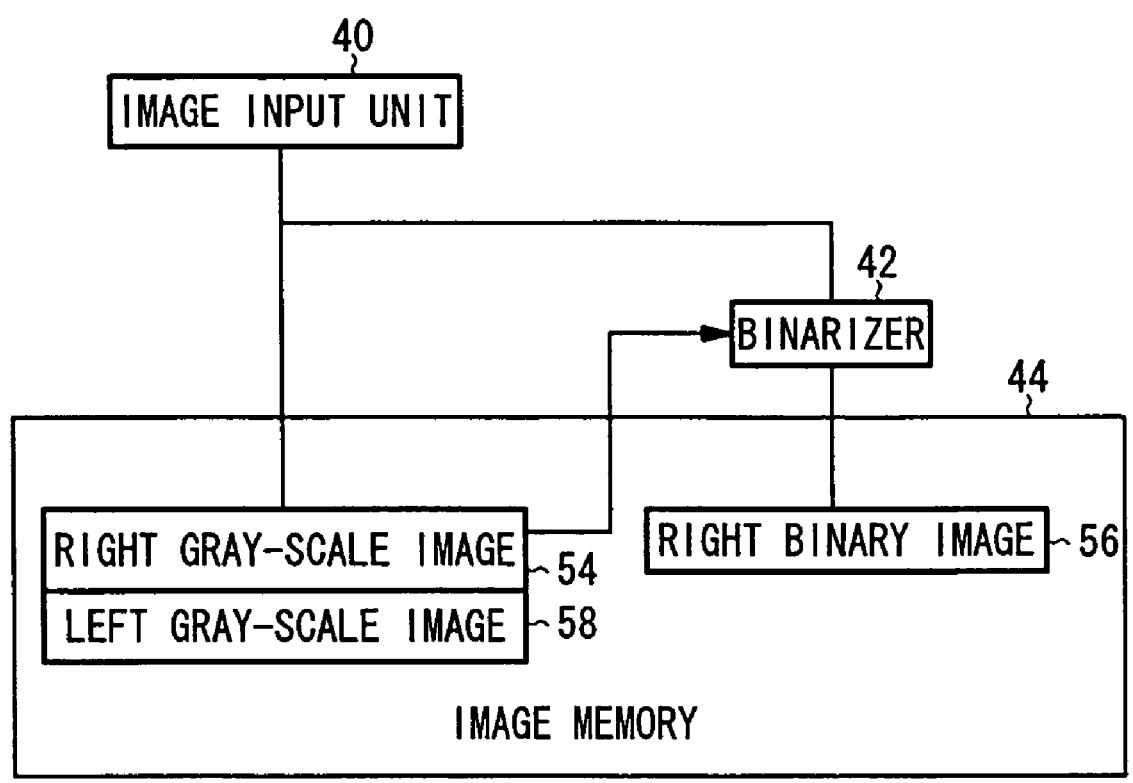
FIG. 3 is a block diagram showing stored data of an image memory in the ECU shown in FIG. 2.

As shown in FIG. 3, the image memory 44 stores a right gray-scale image 54 and a right binary image 56 based on an infrared image obtained by the right infrared camera 16R, and a left gray-scale image 58 based on an infrared image obtained by the left infrared camera 16L. These images are horizontally elongate digital images of scenes in front of the vehicle 12. The right gray-scale image 54 and the left gray-scale image 58 are made up of pixels whose luminance levels are represented by a number of gradations, e.g., 256 gradations. The right binary image 56 is made up of pixels whose luminance levels are represented by 0 and 1. Actually, the image memory 44 can store a plurality of these images.

As shown in FIG. 2, the aiming mode execution unit 48 has a manufacturing plant mode unit 70 for performing the aiming process with an aiming target control apparatus 100 (see FIG. 4) as the external computer system in the manufacturing plant in which the vehicle 12 is manufactured, and a service mode unit 72 for performing the aiming process with a service aiming setting apparatus 120 (see FIG. 5) as the external computer system in a service factory or the like. Either the manufacturing plant mode unit 70 or the service mode unit 72 is selected at a time based on an instruction from a corresponding one of the external computer systems.

The aiming mode execution unit 48 has a parameter input unit 74 for inputting certain parameters from the external computer system when the aiming process is initiated, an initializing unit 76 for making initial settings required by the aiming process, a template matching unit 78 for performing template matching on the gray-scale images 54, 58 stored in the image memory 44, a luminance adjustment LUT setting unit 80 for setting a luminance adjustment LUT for adjusting the luminance of image signals produced by the infrared cameras 16R, 16L, a camera image distortion correcting unit 82 for correcting image distortions caused due to individual differences as to focal lengths, pixel pitches, etc. between the infrared cameras 16R, 16L, a camera mounting angle calculating unit 84 for calculating respective mounting angles (a pan angle and a pitch angle) of the infrared cameras 16R, 16L, a camera image clipping coordinate calculating unit 86 for calculating clipping coordinates used as a reference for clipping processed ranges from images, and a parallax offset value calculating unit 88 for calculating a parallax offset value as an error which is contained in the parallax between object images because the optical axes of the infrared cameras 16R, 16L are not parallel to each other.

The parallax offset value calculating unit 88 functions as an actual parallax calculating unit for calculating an actual parallax between images of an object which are obtained by the infrared cameras 16R, 16L, and a parallax corrective value calculating unit for clipping image areas from the images obtained by the infrared cameras 16R, 16L according to respective pan angles thereof and calculating a parallax offset value for increasing range-finding accuracy.

The initializing unit 76 has a template setting unit 94 for selecting one of six templates TP1, TP2, TP3, TP4, TP5, TP6 (collectively also referred to as "template TP") that have been prepared depending on the distance up to objects. The ECU 14 has a model memory 96 for storing, as a formula, a perspective transformation model for determining the position of an object. The aiming mode execution unit 48 and the normal mode execution unit 50 calculate the position of an imaged object using the perspective transformation model stored in the model memory 96. The model memory 96 stores a short-distance model for objects at short distances and a long-distance model for objects at long distances.

Figure 4:
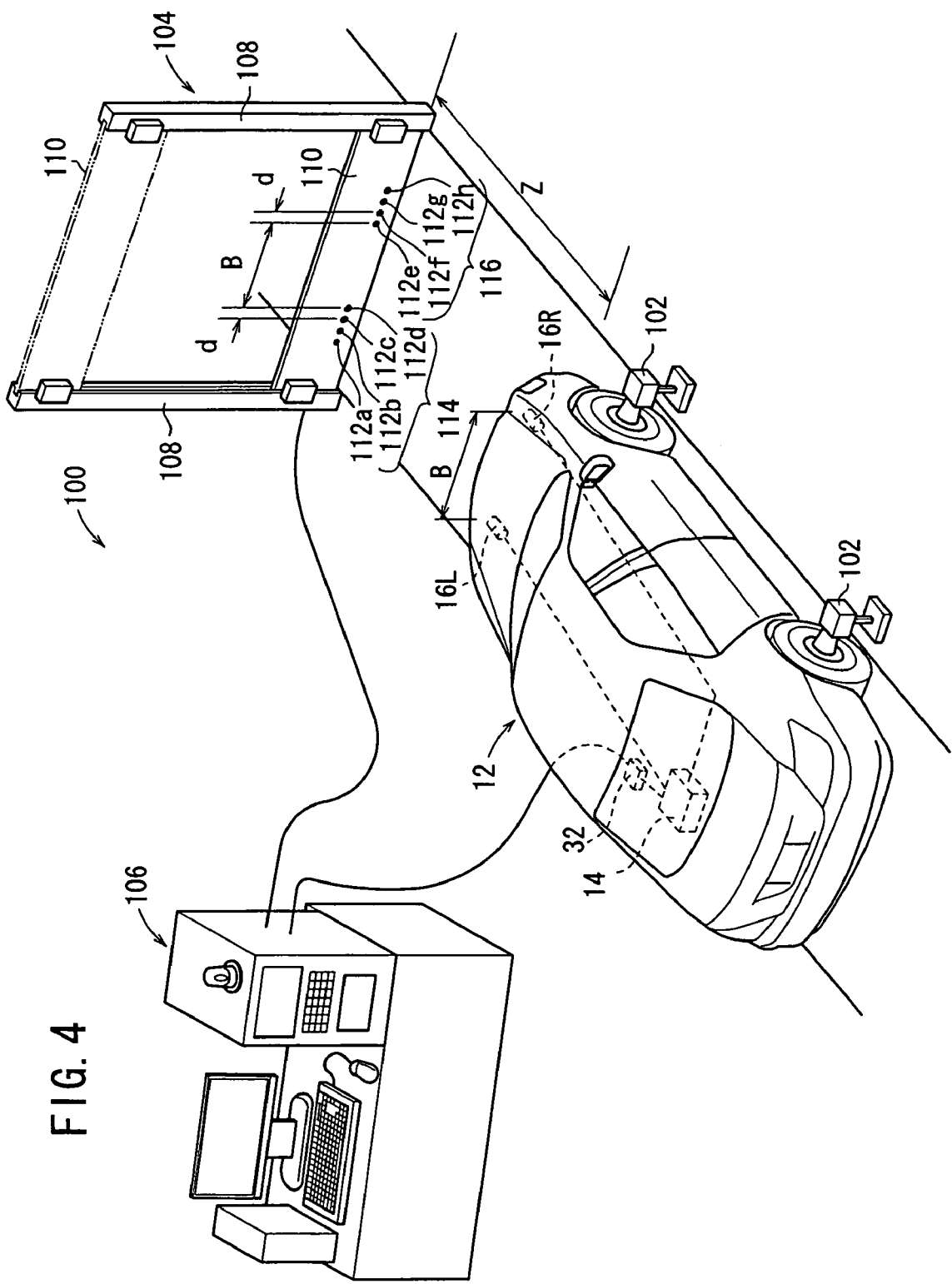
FIG. 4 is a perspective view of an aiming target control apparatus and the vehicle.

As shown in FIG. 4, the aiming target control apparatus 100 has positioning devices 102 for positioning the vehicle 12, a gate 104 disposed at a known distance Zf in front of the infrared cameras 16R, 16L on the vehicle 12 that is positioned by the positioning devices 102, and a main control device 106 for communicating with the ECU 14 through the connector 32 and controlling the gate 104. The gate 104 has two vertical posts 108 horizontally spaced from each other by a distance which is slightly greater than the width of the vehicle 12, and a horizontally elongate target plate 110 having left and right ends movably supported respectively by the posts 108. The target plate 110 is vertically movable along the posts 108 by the main control device 106. The target plate 110 supports thereon an array of eight aiming targets 112a, 112b, 112c, 112d, 112e, 112f, 112g, 112h (collectively also referred to as "aiming target(s) 112") as heat sources that are successively arranged horizontally from the left in the order named.

The four left aiming targets 112a through 112d are spaced at relatively small intervals d (d<B) and belong to a left target group 114. The four right aiming targets 112e through 112h are also spaced at the intervals d and belong to a right target group 116. The aiming target 112d on the right end of the left target group 114 and the aiming target 112e on the left end of the right target group 116 are spaced from each other by a distance which is equal to the base length B. These aiming targets 112d, 112e are positioned just in front of the infrared cameras 16L, 16R, respectively.

Figure 5:
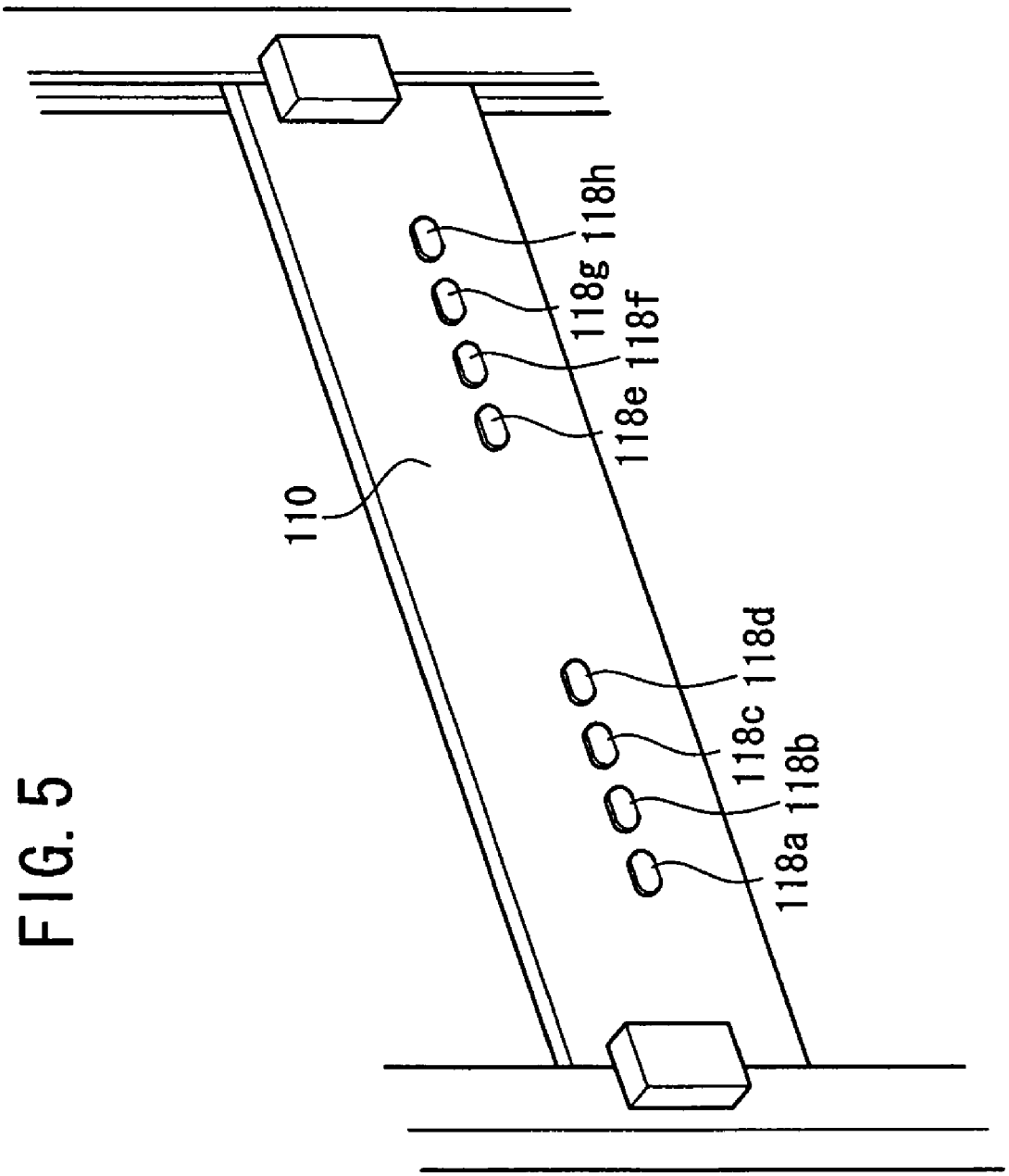
FIG. 5 is a perspective view of a modified target plate.

The aiming targets 112a through 112h are not limited to heat sources such as heating bodies, but may be in the form of small metal plates (aluminum plates or the like) 118a through 118h as heat reflecting plates, as shown in FIG. 5. Since the aiming targets 112a through 112h in the form of metal plates reflect heat (infrared radiation) generated and radiated by the vehicle 12, the aiming targets 112a through 112h can be imaged by the infrared cameras 16R, 16L. According to the modification shown in FIG. 5, the aiming targets 112a through 112h do not need to be selectively turned on and off, and do not consume electric power. If the target plate 110 is made of a material having a low heat reflectance, then a clear contrast is obtained between the metal plates 118a through 118h and the target plate 110 in the obtained images.

Figure 6:
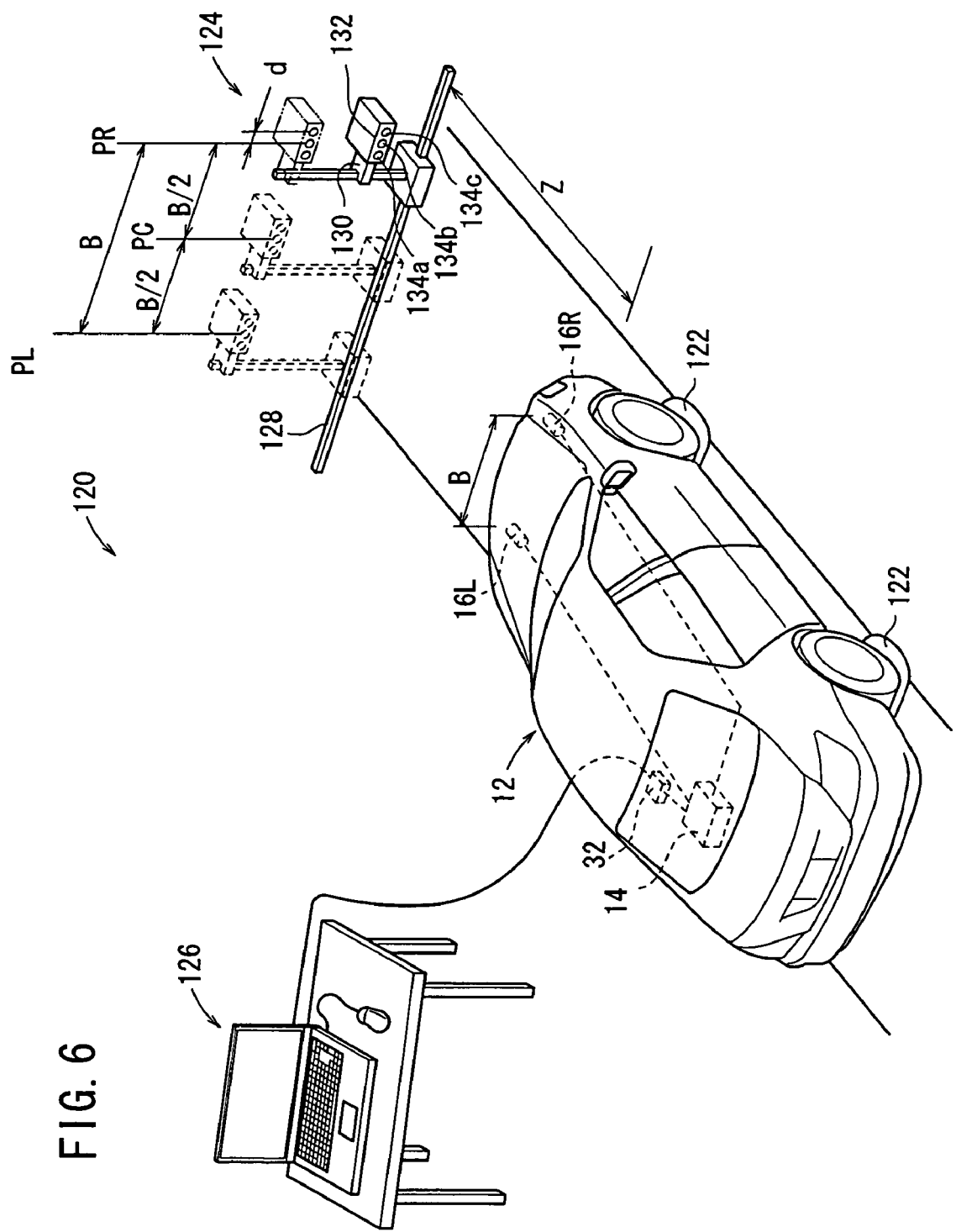
FIG. 6 is a perspective view of a service aiming setting apparatus and the vehicle.

As shown in FIG. 6, the service aiming setting apparatus 120 has positioning markers 122 indicative of the positions of the wheels of the vehicle 12 in an aiming setting process, a headlight tester 124 disposed at a certain distance (hereinafter referred to as object distance) Z in front of the infrared cameras 16R, 16L on the vehicle 12 that is positioned based on the positioning markers 122, and a main control device 126 for communicating with the ECU 14 through the connector 32. The headlight tester 124 is movable along a rail 128 in directions parallel to the transverse direction of the vehicle 12 and has a lifter table 130 which is vertically movable. The lifter table 130 supports thereon a target plate 132 having three aiming targets 134a, 134b, 134c (collectively also referred to as "aiming target(s) 134") as heat sources that are successively arranged horizontally. The aiming targets 134 are spaced at the intervals d (d<B). The aiming target 134 may be identical to or substantially the same as the aiming target 112 of the gate 104 shown in FIG. 4.

A general perspective transformation model M, and a short-distance model and a long-distance model that are stored in the model memory 96 will be described below.

Figure 7:
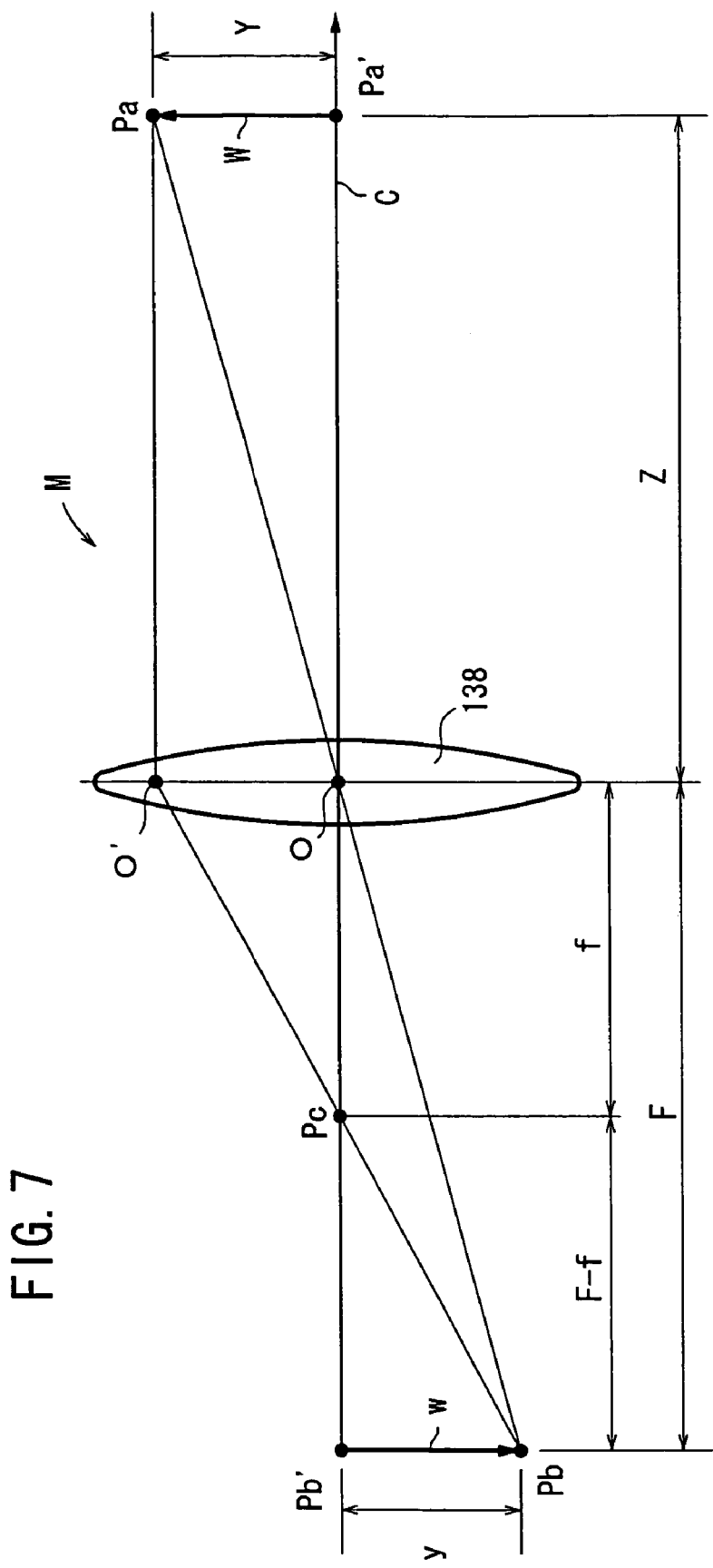
FIG. 7 is a diagram showing a general perspective transformation model.

As shown in FIG. 7, the perspective transformation model M is a model representative of a process for obtaining an image w having a height y from an object W having a height Y through a lens 138 having a focal length f. Specifically, a light ray from a point Pa on an end of the object W to the center O of the lens 138 travels straight through the lens 138, and a light ray traveling from the point Pa parallel to the optical axis C is refracted at a point O' in the lens 138. These light rays are converged at a point Pb. A light ray from a point Pa' on the other end of the object W to the center O of the lens 138 travels straight along the optical axis C and reaches a point Pb'. The light rays from the object W which is spaced from the lens 138 by a distance Z are focused by the lens 138 to form the object w having the height y, whose one end is on the point Pb and the other end on the point Pb', at a focusing distance F from the lens 138 remotely from the object W. The image w is inverted from the object W.

Since a triangle defined by three points Pa, Pa', O and a triangle defined by three points Pb, Pb', O are similar to each other, and a triangle defined by three points O, O', Pc and a triangle defined by three points Pb, Pb', Pc where Pc represents the position on the optical axis C at the focal length f of the lens 138 toward the image w, are similar to each other, the following equations (1), (2) are satisfied:

$$y/Y=F/Z \quad (1)$$

$$y/Y=(F-f)/f \quad (2)$$

By deleting y, Y from the equations (1), (2), the following equation (3) is obtained:

$$F=fZ/(Z-f) \quad (3)$$

Since the object distance Z is known in the aiming mode, the focusing distance F is established according to the equation (3) in steps S8, S33 to be described later. Actually, the equation (3) may be included in equations (7-1) through (7-4) to be described later.

If the object W is sufficiently far away from the lens 138 (Z>>f), then the equation (3) can be approximated by the following approximate expression (4):

$$F \approx f(=fZ/Z) \quad (4)$$

The width X of the object W can also be expressed by a perspective transformation model M similar to the perspective transformation model M used with respect to the height Y, and the width of the object w is represented by x. The actual image w is focused on the side of the lens 138 which is opposite to the object W. For simplifying the model, however, a hypothetical focusing plane S may be provided on the same side of the lens 138 as the object W at the position of the focusing distance F from the lens 138. Therefore, as shown in FIG. 8, the object W and the image w are represented by similar erected images with respect to the lens center O, and the object W is transformed onto the focusing plane S.

Figure 8:
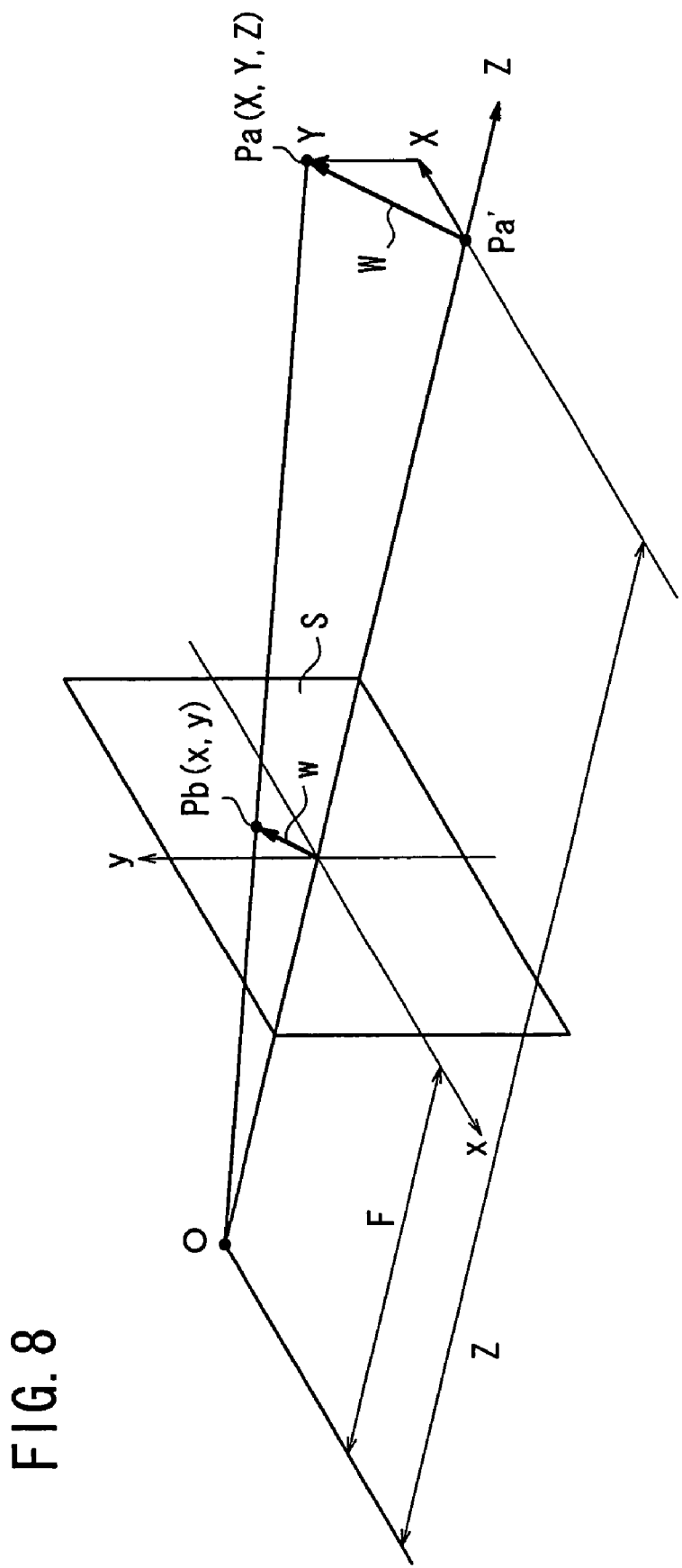
FIG. 8 is a diagram showing the manner in which an image is transformed onto a focusing plane by the perspective transformation model.

As shown in FIG. 8, the width x and the height y of the image w on the focusing plane S are expressed by the following equations (5), (6):

$$x=F/Z \cdot X/p \quad (5)$$

$$y=F/Z \cdot Y/p \quad (6)$$

where p is a parameter representing the pixel pitch of an actual digital image to which the focusing plane S is applied. If the object W is positioned at a relatively short distance, then since an error caused when the equation (4) is applied is not negligible, the equation (3) is substituted for F in the equations (5), (6). As a result, a perspective transformation model at the time the object W is positioned at a relatively short distance is expressed by the following first expression group of expressions (7-1) through (7-4):

$$x \leftarrow \frac{f}{Z-f}\frac{X}{p} \quad (7\text{-}1)$$

$$y \leftarrow \frac{f}{Z-f}\frac{Y}{p} \quad (7\text{-}2)$$

-continued $$X \leftarrow \frac{Z-f}{f}px \quad (7\text{-}3)$$

$$Y \leftarrow \frac{Z-f}{f}py \quad (7\text{-}4)$$

The first expression group is included in the short-distance model stored in the model memory 96. When the mode selector 52 selects the aiming mode in step S3 to be described later, the first expression group is selected by the aiming mode execution unit 48, and used to calculate the positions of the aiming targets 112 or 134. Specifically, in a manufacturing plant aiming mode, a value that is automatically set as the known distance Zf is used as the object distance Z, and in a service aiming mode, the object distance Z input from the main control device 126 is used. Since the aiming targets 112 or 134 have known coordinates X in the transverse direction of the vehicle and known coordinates Y in the direction of the height, theoretical coordinates Pb (x, y) of the image w on the focusing plane S are determined according to the expressions (7-1), (7-2). In the service aiming mode, the height coordinates Y are corrected based on the camera height H (see FIG. 1).

Thereafter, the theoretical coordinates Pb (x, y) and the actually obtained coordinates in the actual image of the aiming targets 112 are compared with each other to determine mounting angles of the infrared cameras 16R, 16L. Alternatively, theoretical coordinates of the aiming targets 112 may be determined from the coordinates in the actual image according to the expressions (7-3), (7-4), and compared with the known coordinates X, Y to determine mounting angles of the infrared cameras 16R, 16L.

Because the first expression group is established based on the equation (3) representative of the focusing distance F, theoretical coordinates Pb (x, y) can accurately be determined, with the result that mounting angles of the infrared cameras 16R, 16L can be determined highly accurately.

If the object W is distant, then the expression (4) may be used as an approximate equation, and the equations (5), (6) are represented by the following second expression group of expressions (8-1) through (8-4):

$$x \leftarrow \frac{fX}{Zp} \quad (8\text{-}1)$$

$$y \leftarrow \frac{fY}{Zp} \quad (8\text{-}2)$$

$$X \leftarrow \frac{Zpx}{f} \quad (8\text{-}3)$$

$$Y \leftarrow \frac{Zpy}{f} \quad (8\text{-}4)$$

The second expression group is included in the long-distance model stored in the model memory 96. When the mode selector 52 selects the normal mode in step S3 to be described later, the second expression group is selected by the normal mode execution unit 50, and used to calculate the position of the object. Specifically, after the object distance Z up to the object is calculated from the parallax between the two images obtained by the infrared cameras 16R, 16L, coordinates X, Y in the space of the object are determined from the coordinates in the images according to the expressions (8-3), (8-4). Generally, in the normal mode, the object distance Z is sufficiently greater than the focal distance f, and hence the error of the expression (4) is of a negligible level, so that the coordinates X, Y of the object can be determined sufficiently accurately according to the expressions (8-3), (8-4). Since the expressions (8-3), (8-4) are simpler than the above expressions (7-3), (7-4), the expressions (8-3), (8-4) make it possible to perform faster calculations.

In the normal mode, if the determined object distance Z is equal to or smaller than a predetermined threshold, then the expressions (7-3), (7-4) may be used.

The aiming process to be performed on the night vision system 10 using the aiming target control apparatus 100 or the service aiming setting apparatus 120 will be described below.

The aiming process includes a manufacturing plant aiming mode to be performed in a manufacturing plant using the aiming target control apparatus 100 and a service aiming mode to be performed in a service factory using the service aiming setting apparatus 120.

In the manufacturing plant aiming mode, the vehicle 12 is positioned by the positioning devices 102, and the main control device 106 is connected to the connector 32 of the vehicle 12. The main control device 106 sends an instruction for performing the manufacturing plant aiming mode using the aiming target control apparatus 100 to the ECU 14. The aiming targets 112a through 112h are positionally adjusted to a prescribed height depending on the type of the vehicle 12.

In the service aiming mode, the vehicle 12 is positioned with the wheels aligned with the respective positioning markers 122, and the main control device 126 is connected to the connector 32 of the vehicle 12. The main control device 126 sends an instruction for performing the service aiming mode using the service aiming setting apparatus 120 to the ECU 14. The aiming targets 134a through 134c are positionally adjusted to a prescribed height.

FIGS. 9, 11 through 14 show the aiming process that is mainly performed by the aiming mode execution unit 48 of the ECU 14. The aiming process will be described in detail below with reference to FIGS. 9, 11 through 14.

Figure 9:
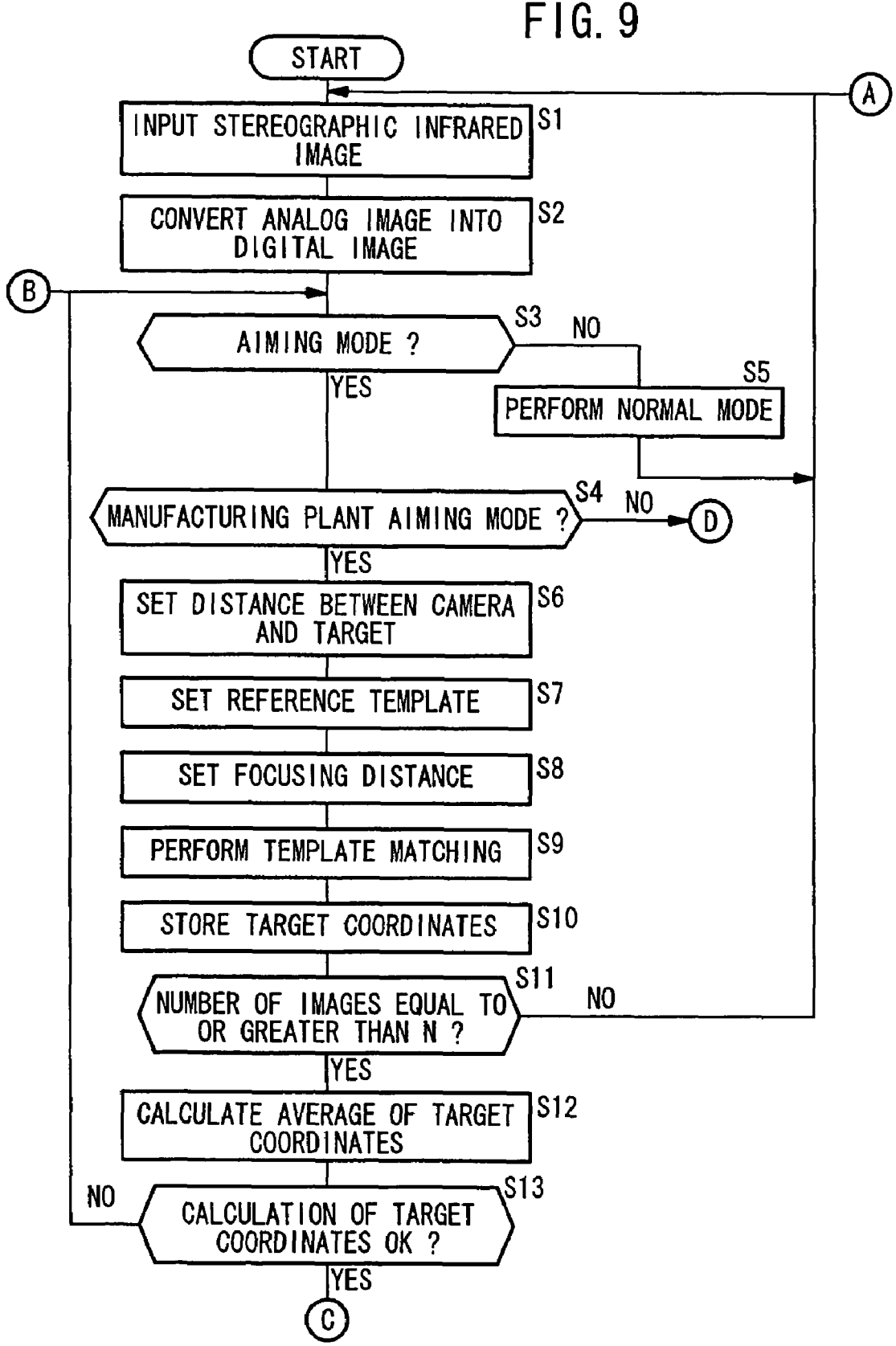
FIG. 9 is a flowchart of an aiming process.

In step S1 shown in FIG. 9, analog stereographic infrared images are input from the infrared cameras 16R, 16L to the image input unit 40. The image input unit 40 converts the analog stereographic infrared images into digital gray-scale images 54, 58 in step S2. The gray-scale images 54, 58 are stored in the image memory 44 until predetermined instructions for clearing or overwriting are input. A plurality of these gray-scale images 54, 58 can be stored in the image memory 44. The gray-scale images 54, 58 are converted by the binarizer 42 into binary images, and the right binary image 56 is stored in the image memory 44.

In step S3, the mode selector 52 determines whether the aiming mode or the normal mode is to be executed according to an instruction from the main control device 106 or 126. If the normal mode is to be executed, then control goes to step S5. If the aiming mode is to be executed, then control goes to step S4.

In the normal mode in step S5, the normal mode execution unit 50 operates to refer to the camera parameters stored in the camera parameter memory 46, and controls the HUD 18 and the speaker 20 to search for an object and draw the driver's attention if necessary.

In the aiming mode in step S4, the mode selector 52 determines which of the aiming target control apparatus 100 and the service aiming setting apparatus 120 is to be used. If it is judged that the aiming target control apparatus 100 is to be used, then control goes to step S6 in order for the manufacturing plant mode unit 70 to perform the manufacturing plant aiming mode. If it is judged that the service aiming setting apparatus 120 is to be used, then control goes to step S30 (see FIG. 12) in order for the service mode unit 72 to perform the service aiming mode. The manufacturing plant aiming mode and the service aiming mode will successively be described below.

In the manufacturing plant aiming mode, a distance (i.e., the object distance Z) from the infrared cameras 16R, 16L to the target plate 110 is set in step S6. In this case, the object distance Z is automatically set as the known distance Zf.

Figure 10:
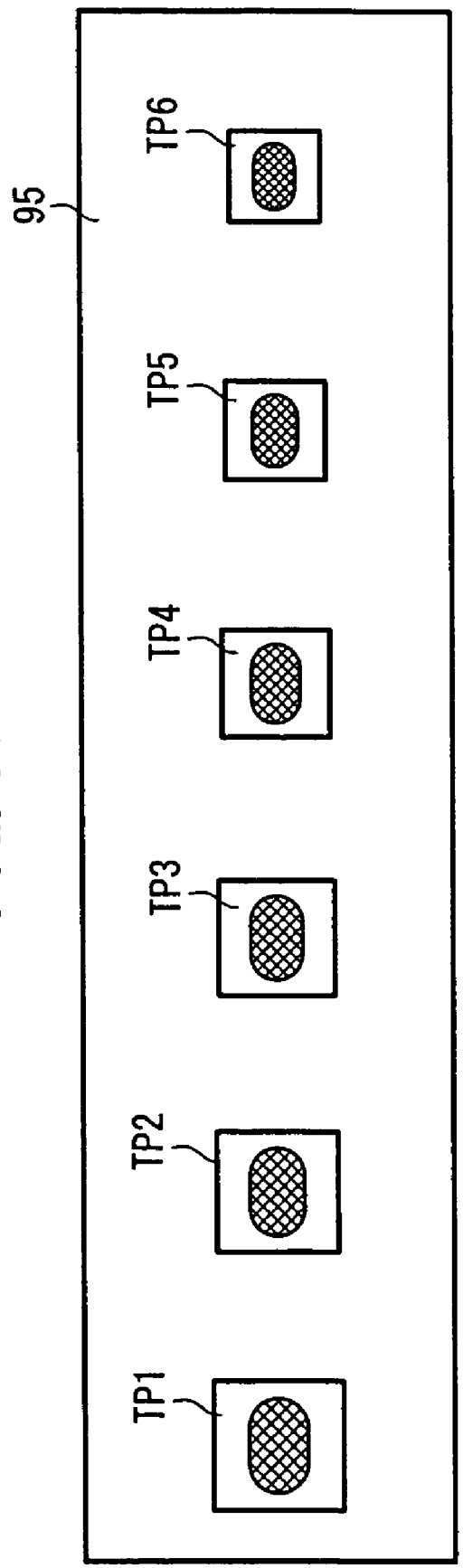
FIG. 10 is a diagram showing data stored in a template memory.

In step S7, the template setting unit 94 selects a reference template depending on the object distance Z. As shown in FIG. 10, the templates TP1, TP2, TP3, TP4, TP5, TP6 represent respective small image data produced by imaging respective provisional targets arranged at prescribed distances. The prescribed distances are set as distances Z1, Z2, Z3, Z4, Z5, Z6 which are defined at equal intervals (or equal ratio intervals) and which are successively far from the infrared cameras 16R, 16L (Z1<Z2< . . . <Z6). The templates TP1, TP2, TP3, TP4, TP5, TP6 are stored in the template memory 95 in the ECU 14. The provisional targets are identical to the aiming targets 112. In the manufacturing plant aiming mode, if the known distance Zf is Zf=Z3, then the template TP3 is selected as a reference template.

In step S8, the focusing distance F is established based on the perspective transformation model M (see FIG. 7).

Steps S6 through S8 are carried out by the initializing unit 76 only once for the first time when the aiming process is performed, while referring to a parameter representative of the number of times that they are executed.

In step S9 (an object extracting unit), a template matching process is performed based on the reference template selected in step S7. Specifically, correlative calculations are performed on the gray-scale images 54, 58 of the aiming target 112 obtained by the infrared cameras 16R, 16L and the template TP, and coordinates of a gray-scale image for which the results of the correlative calculations are minimum are calculated and stored in step S10 (a target coordinate calculating unit). For correlative calculations, SAD (the sum of absolute differences) per pixel is used, for example.

In step S11, it is confirmed whether the number of each of the acquired gray-scale images 54, 58 has reached a predetermined number N or not. If the number of acquired gray-scale images 54, 58 has reached the predetermined number N, then control goes to step S12. If the number of acquired gray-scale images 54, 58 is smaller than the predetermined number N, then control goes back to step S1 to continuously acquire gray-scale images 54, 58 and calculate and store target coordinates.

In step S12, an average value Pave of the calculated N sets of target coordinates is calculated. If it is judged that target coordinates are properly calculated in step S13, then control goes to step S14 (see FIG. 11). If it is judged that target coordinates are not properly calculated in step S13, then control goes back to step S3.

Figure 11:
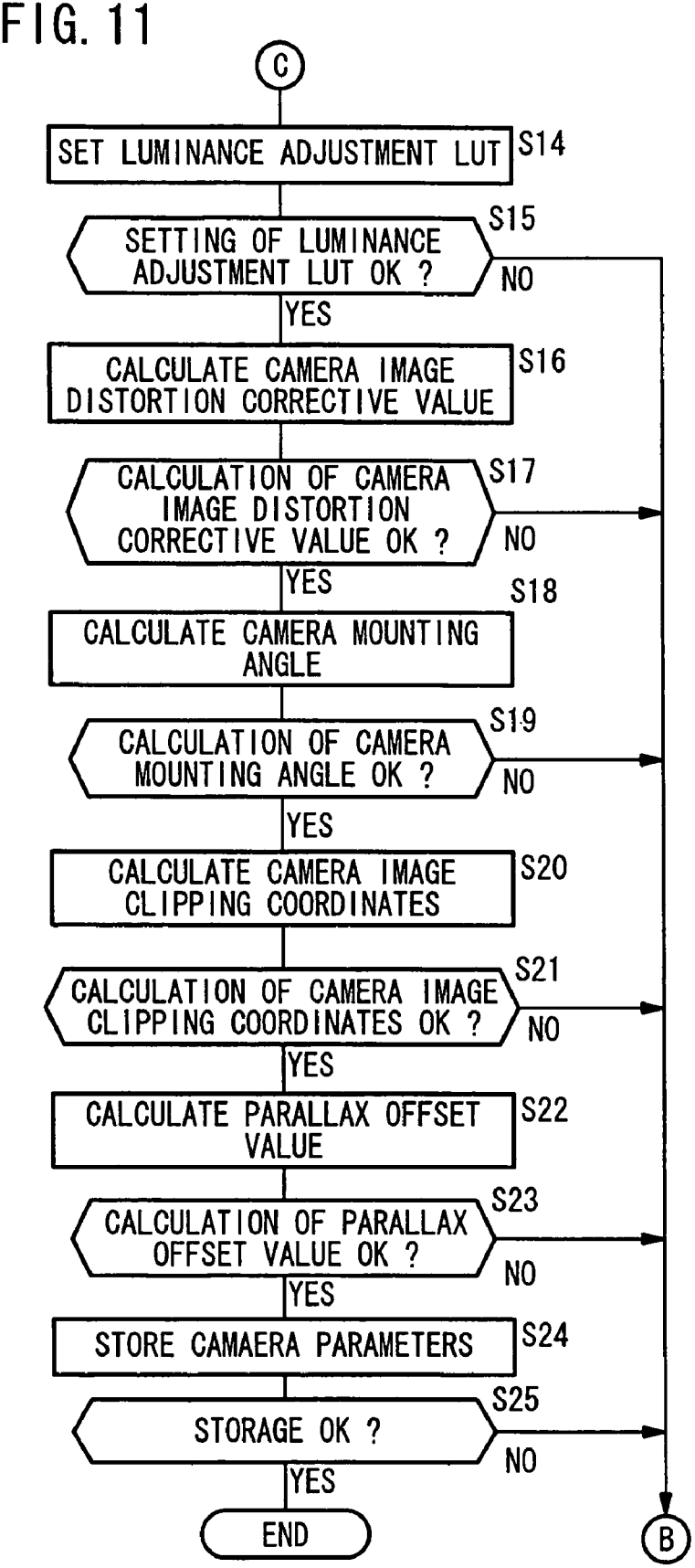
FIGS. 11 through 14 are flowcharts of the aiming process.

In step S14 shown in FIG. 11, a luminance adjustment LUT is set. Specifically, in order to reliably perform the template matching process based on correlative calculations, the levels of luminance signals of the aiming target 112 which are detected by the infrared cameras 16R, 16L are compared with each other, and a luminance adjustment LUT is set such that the luminance signal from the infrared camera 16R, which is used as a reference for the correlative calculations, will be greater at all times than the luminance signal from the infrared camera 16L at each of the luminance levels. If it is judged that the process of setting a luminance adjustment LUT is properly performed in step S15, then control goes to step S16.

In step S16, an image distortion corrective value for correcting image distortions caused due to individual differences as to focal lengths, pixel pitches, etc. between the infrared cameras 16R, 16L is calculated. If it is judged that an image distortion corrective value is properly calculated in step S17, then control goes to step S18.

In step S18, a pan angle and a pitch angle (also referred to as a tilt angle), which serve as mounting angles of the left and right cameras, i.e., the infrared cameras 16R, 16L, are calculated. If it is judged that mounting angles of the left and right cameras are properly calculated in step S19, then control goes to step S20.

The pan angle refers to an angle by which the infrared cameras 16R, 16L are turned in a hypothetical camera array plane including the optical axes of the infrared cameras 16R, 16L which are at the same height. The pan angle extends in a direction of parallax, i.e., the x direction (see FIG. 8) in obtained images. The pitch angle refers to an angle of depression/elevation in a vertical plane normal to the hypothetical camera array plane. The pitch angle extends in the y direction in obtained images.

In step S20, clipping coordinates for clipping image areas to be processed from the images obtained by the infrared cameras 16R, 16L are calculated. If it is judged that clipping coordinates are properly calculated in step S21, then control goes to step S22.

In step S22, a parallax offset value, which represents an error contained in the parallax between object images because the optical axes of the infrared cameras 16R, 16L are not parallel to each other, is calculated. If it is judged that a parallax offset value is properly calculated in step S23, then control goes to step S24.

In step S24, the luminance adjustment LUT, the image distortion corrective value, the pan angle and the pitch angle, the clipping coordinates, and the parallax offset value which are determined respectively in steps S14, S16, S18, S20, and S22 are stored in the camera parameter memory 46. If these parameters are properly stored, then the manufacturing plant aiming mode (or the service aiming mode) is finished. At this time, the ECU 14 sends a signal indicating that the aiming mode is finished to the main control device 106 or 126. If the normal mode is to be subsequently executed, then a predetermined restarting process may be performed. If the answers to the branching processes in steps S17, S19, S21, S23, and S25 are negative, then control goes back to step S3 as when the answer to the branching process in step S13 is negative.

The service aiming mode will be described below. In the service aiming mode, steps S1 through S3 (see FIG. 9) are executed in the same manner as with the manufacturing plant aiming mode. Control then branches from step S4 to step S30 for the service mode unit 72 to perform a processing sequence shown in FIGS. 12 through 14.

Figure 12:
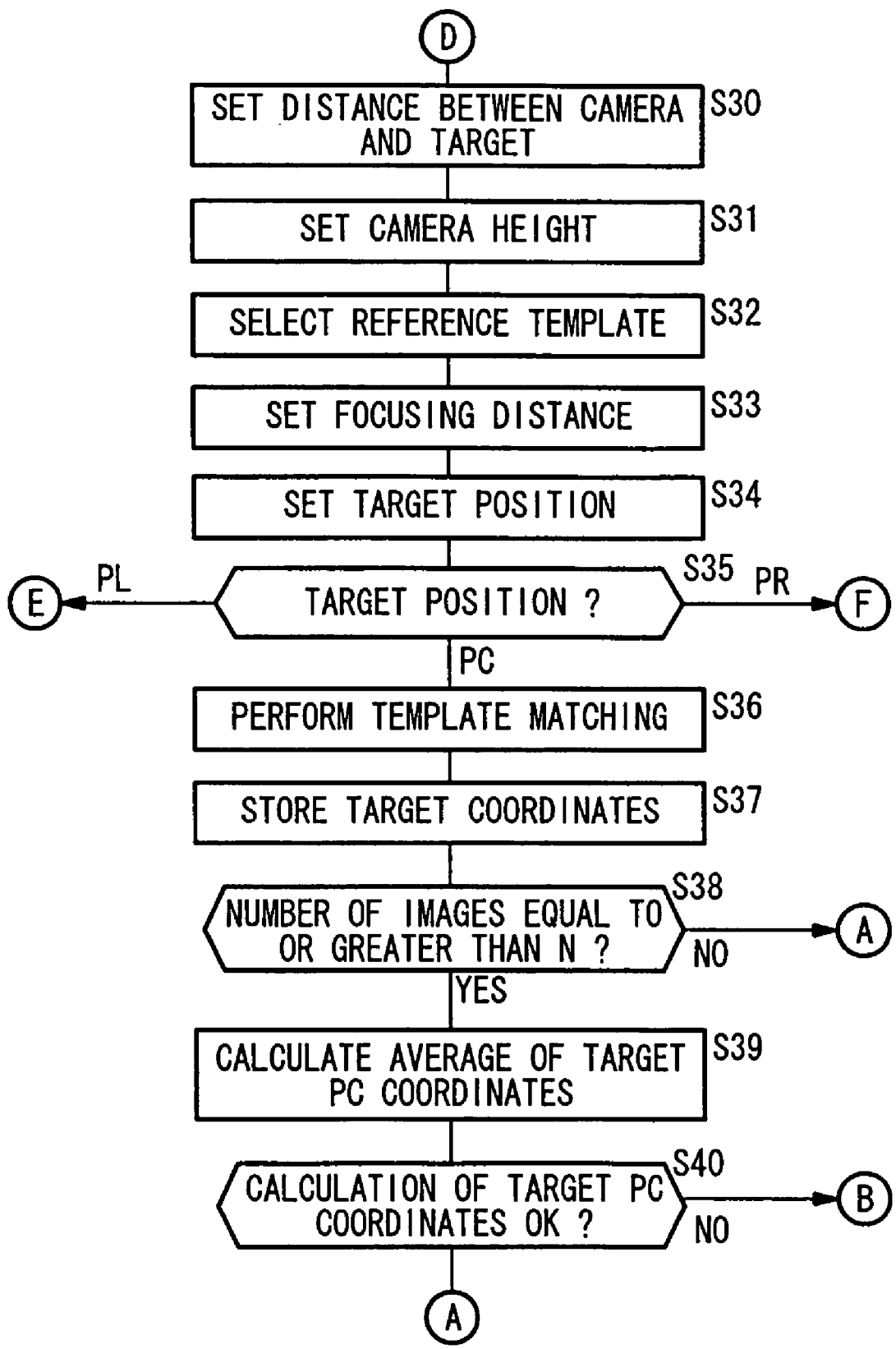

In step S30 shown in FIG. 12, a distance from the infrared cameras 16R, 16L to the target plate 132, i.e., the object distance Z, is input and set. Specifically, the object distance Z is input as a numerical value in a range from Z1 to Z7 (>Z6) from the main control device 126, and supplied to the ECU 14. The object distance Z may be determined by inputting a distance from a location that can easily be measured, e.g., a positioning marker 122, and subtracting a predetermined offset from the input distance. Alternatively, a laser beam distance detector may be used as an object distance detecting unit to automatically detect and input the object distance Z.

In step S31, the height H (see FIG. 1) of the infrared cameras 16R, 16L is confirmed and input.

In step S32, the template setting unit 94 selects one of the templates TP1 through TP6 depending on the object distance Z as a reference template. As described above, the templates TP1 through TP6 are set as prescribed distances Z1 through Z6 when the image of the provisional target is obtained. In step S32, the corresponding prescribed distance is equal to or smaller than the object distance Z, and a template closest to the object distance Z is selected. Specifically, if the object distance Z is in the range from Z1 to Z2', from Z2 to Z3', from Z3 to Z4', from Z4 to Z5', from Z5 to Z6', and from Z6 to Z7, then the templates TP1 through TP6 are successively selected correspondingly. Z2', Z3', Z4', Z5', Z6' represent values that are smaller than Z2, Z3, Z4, Z5, Z6, respectively, by a minimum input unit. More specifically, if the object distance Z is in the range from Z4 to Z5', the template Z4 is selected.

In step S33, the focusing distance F is set in the same manner as with step S8. Steps S30 through S33 are carried out by the initializing unit 76 only once for the first time when the aiming process is performed, while referring to a parameter representative of the number of times that they are executed.

In step S34, the position of the target plate 132 is confirmed. Specifically, in the service aiming mode, the target plate 132 is placed successively in a central position PC, a left position PL, and a right position PR (see FIG. 6). When step S34 is executed for the first time, a signal for positional confirmation is sent to the main control device 126 to place the target plate 132 in the central position PC. In response to the signal, the main control device 126 displays a message "PLACE TARGET IN CENTRAL POSITION PC AND PRESS "Y" KEY" on the monitor screen, for example. According to the message, the operator moves the headlight tester 124 along the rail 128 either manually or with a given actuator until the target plate 132 is placed in the central position PC, and then presses the "Y" key.

Step S34 is executed repeatedly. At every N executions, the main control device 126 displays a message such as "PLACE TARGET IN LEFT POSITION PL AND PRESS "Y" KEY" or "PLACE TARGET IN RIGHT POSITION PR AND PRESS "Y" KEY" on the monitor screen, for drawing attention of the operator so that the operator may move the target plate 132 to be placed in the left position PL or the right position PR, and press the "Y" key. If it is confirmed that: the target plate 132 is positioned in the central position PC for the first time and the "Y" key is pressed; or the target plate 132 is positioned in the left position PL for the first time and the "Y" key is pressed; or the target plate 132 is positioned in the right position PR for the first time and the "Y" key is pressed, then control goes to step S35. Substantive process is not performed except for the above timing.

In step S35, control is branched depending on the position of the target plate 132 at the time. If the target plate 132 is placed in the central position PC (in first through Nth cycles), then control goes to step S36. If the target plate 132 is placed in the left position PL, then control goes to step S41 (see FIG. 13). If the target plate 132 is placed in the right position PR, then control goes to step S46 (see FIG. 14).

In step S36, a template matching process is performed in the same manner as with step S9.

In step S37, target coordinates of the aiming target 134 are calculated and stored in the same manner as with step S10.

In step S38, the number of acquired gray-scale images 54, 58 is confirmed in the same manner as with step S11. If the number of each of acquired gray-scale images 54, 58 is N or more, then control goes to step S39. If the number of acquired gray-scale images is smaller than N, then control goes back to step S1. In the second and subsequent cycles, steps S3 through S8 and steps S30 through S35 are skipped.

In step S39, an average value Pave of the target coordinates at the central position PC is calculated in the same manner as with step S12. If it is judged that target coordinates are normally calculated in step S40, then control goes back to step S1. If it is judged that target coordinates are not normally calculated in step S40, then control goes back to step S3.

Figure 13:
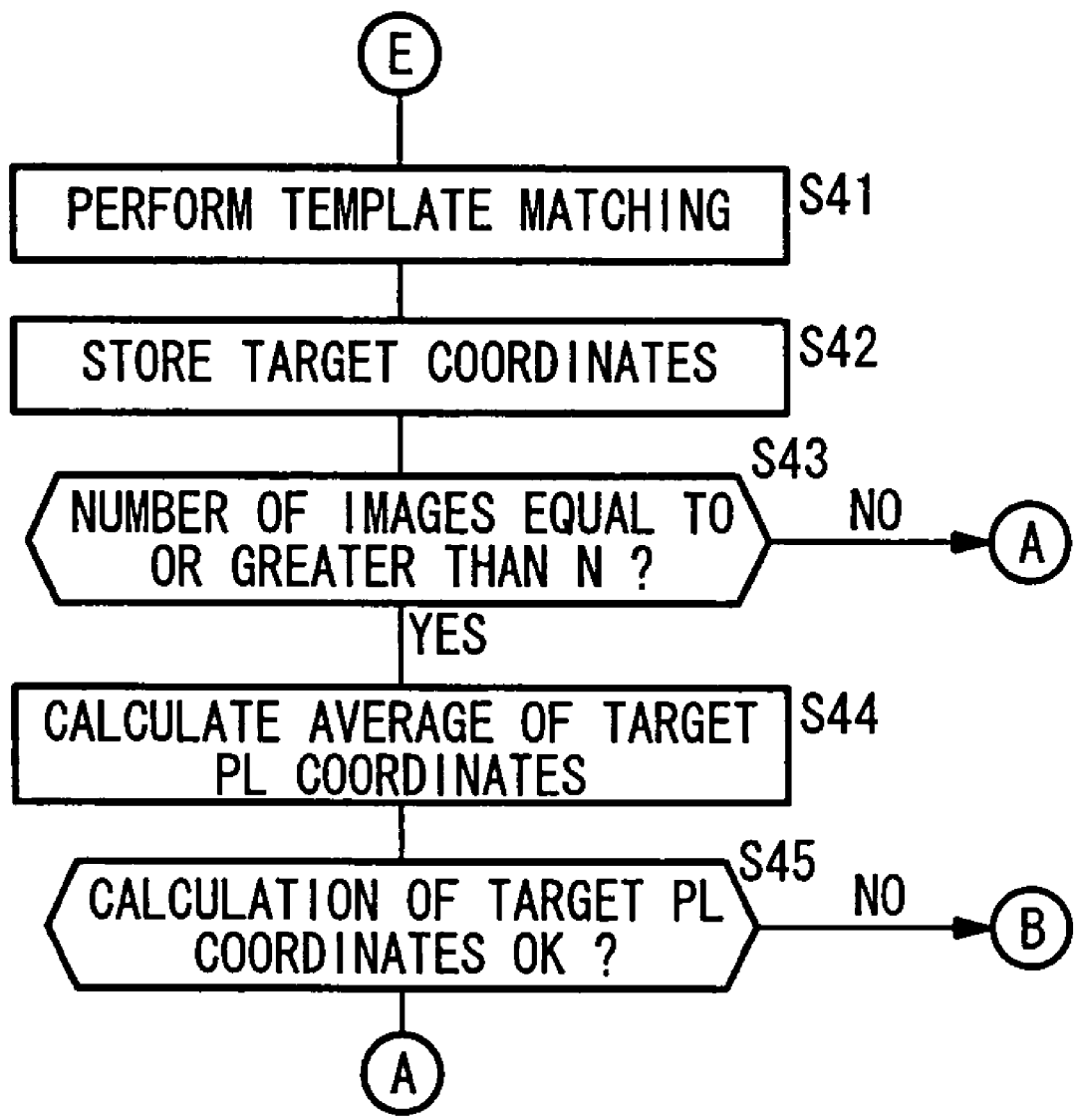

The target plate 132 is placed in the left position PL, and steps S41 through S45 shown in FIG. 13 are similarly executed.

Figure 14:
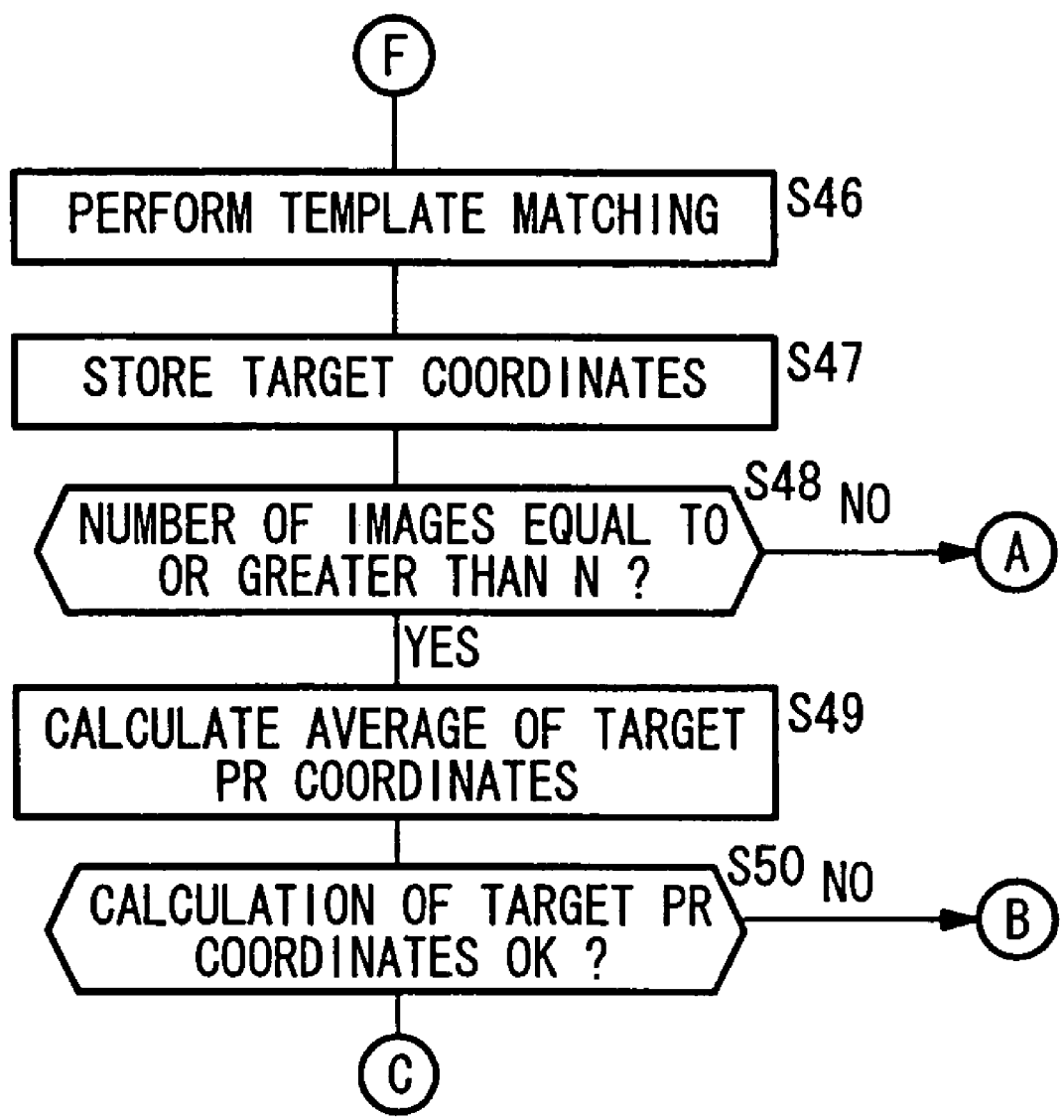

Then, the target plate 132 is placed in the right position PR, and steps S46 through S50 shown in FIG. 14 are similarly executed.

If it is judged that target coordinates are normally calculated in final step S50, then control goes back to step S14 (see FIG. 11). Subsequently, the same process as the manufacturing plant aiming mode is performed, and camera parameters are stored in the camera parameter memory 46.

Details of step S36 for performing the template matching process using the selected reference template (hereinafter referred to as template TPs) will be described below with reference to FIG. 15.

Figure 15:
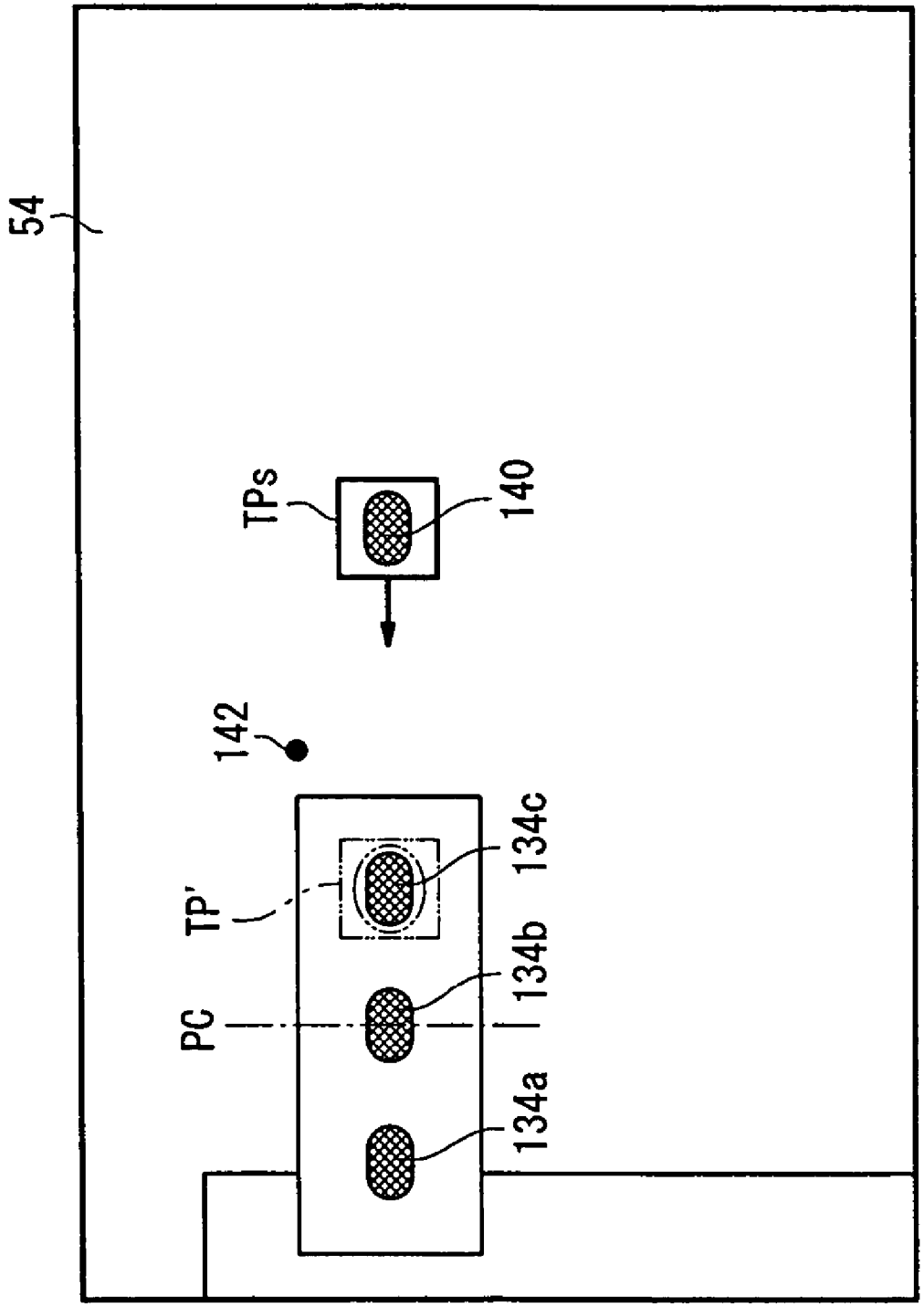
FIG. 15 is a diagram showing a template matching process in an aiming mode.

As shown in FIG. 15, the selected template TPs is moved vertically and horizontally by small distances in a given sequence in the right gray-scale image 54, and the pattern matching process is performed in each of the positions of the selected template TPs to check a pattern match against the background image based on the SAD referred to above.

The size of a provisional target image 140 on the template TPs is greater than the size of the image of each of the aiming targets 134a through 134c in the right gray-scale image 54. This is because the prescribed distance is equal to or smaller than the object distance Z and the template closest to the object distance Z is selected in step S32.

When the template TPs is moved to the position of the aiming target 134c as indicated by the two-dot-and-dash lines TP' in FIG. 15, the image 140 and the aiming target 134c are essentially aligned with each other, with their higher and lower luminance areas overlapping each other, and the SAD is of a sufficiently small value. It is now judged that a pattern match is achieved, and the target coordinates of the aiming target 134c are identified from the central point of the template TPs at the time. Specifically, the coordinates Pb (x, y) (see FIG. 8) of the central point of the area indicated by the two-dot-and-dash lines TP' are stored as Pt[i] in the memory (step S10). The parameter i is a counter representing the number of processing cycles, and is incremented from i=1 to i=N depending on the number of right gray-scale images 54. Though target coordinates are actually determined with respect to each of the aiming targets 134a through 134c, representative target coordinates Pt[i] are illustrated for the sake of brevity.

In step S12, the average value Pave is calculated according to the following expression (9):

$$P_{ave} \leftarrow \left(\sum_{i=1}^{N} Pt[i]\right) / N \quad (9)$$

Because of the averaging process, even if the infrared cameras 16R, 16L or the environments (e.g., the temperature) in which to obtain images are somewhat unstable, errors caused by the instability are canceled out by the average value Pave, allowing accurate target coordinates to be determined.

It is assumed that the service aiming mode is performed in an inspection area of a general service factory or the like. Therefore, it is difficult to fully remove unwanted heat sources for radiating or reflecting infrared radiation other than the aiming targets 134a through 134c, and these unwanted heat sources may possibly be detected as relatively weak radiation levels or small images. For example, another heat source 142, e.g., a distant light, is present near the aiming target 134c in the right gray-scale image 54, and is obtained as an image smaller than the aiming target 134c in the right gray-scale image 54. Since the size of the image 140 of the template TPs is greater than the image of the aiming target 134c, when the templates TPs is moved to the position of the heat source 142, the SAD is of a considerably large value, and is clearly distinguished from the aiming target 134c.

With respect to the aiming targets 134a, 134b, target coordinates Pt[i] are also identified and an average value Pave is determined in the same manner as described above. The aiming targets 134a through 134c can be identified from their relative positional relationship.

The right gray-scale image 54 shown in FIG. 15 is obtained when the headlight tester 124 is placed in the central position PC. The same process as described above is performed when the headlight tester 124 is placed in the right position PR or the left position PL, or when the left gray-scale image 58 is obtained. The same process as described above is also performed in step S9 for the template matching process in the manufacturing plant aiming mode.

Figure 16:
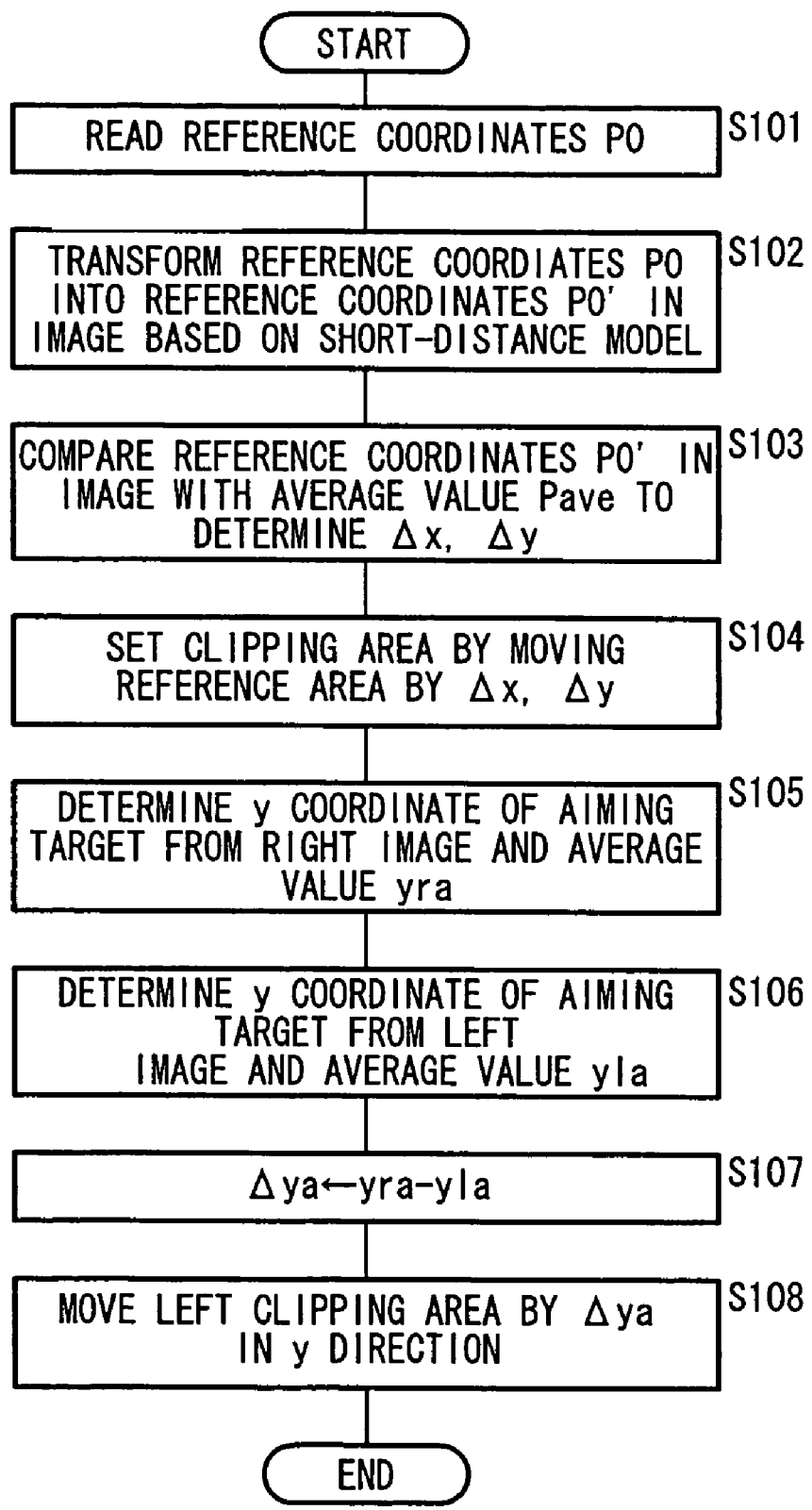
FIG. 16 is a flowchart of a mounting angle calculating process and a process of calculating clipping areas in left and right camera images.

Details of the processing sequence from step S18 for calculating mounting angles of the infrared cameras 16R, 16L to step S20 for calculating clipping coordinates for clipping image areas to be processed from the images obtained by the infrared cameras 16R, 16L, will be described below with respect to the processing of data from the infrared camera 16R with reference to FIG. 16. In FIG. 16, steps S18, S19, S20 shown in FIG. 11 are not distinguished from each other.

In step S101 shown in FIG. 16, reference coordinates P0 representative of spatial coordinates of the target are read from the memory (a coordinate reference value memory unit).

In step S102, the reference coordinates P0 are converted into reference coordinates P0'(x0, y0) in the image according to the expressions (7-1), (7-2) representing the short-distance model. In the aiming mode, the short-distance model is selected in advance, and the coordinates of the target at a relatively short distance can accurately be transformed onto the image.

If the reference coordinates P0 are stored as values in the actual space, for example, then when the position of the target is changed, the actually measured coordinates can directly be input from the main control device 106 or 126. The actually measured coordinates that are input are accurately transformed based on the short-distance model.

In step S103 (a mounting angle calculating unit), the reference coordinates P0' in the image and the average value Pave determined in step S12 are compared with each other to determine a difference Δx between the pan angles and a difference Δy between the pitch angles.

The differences Δx, Δy represent mounting angles as errors of the pan and pitch angles of the infrared cameras 16R, 16L with respect to design reference values depending on the reference coordinates P0'. Specifically, if the design reference values are set to 0°, then when the difference Δx is of a value corresponding to 2° and the difference Δy is of a value corresponding to 1°, the pan angle is determined as 2° and the pitch angle as 1°.

Figure 17:
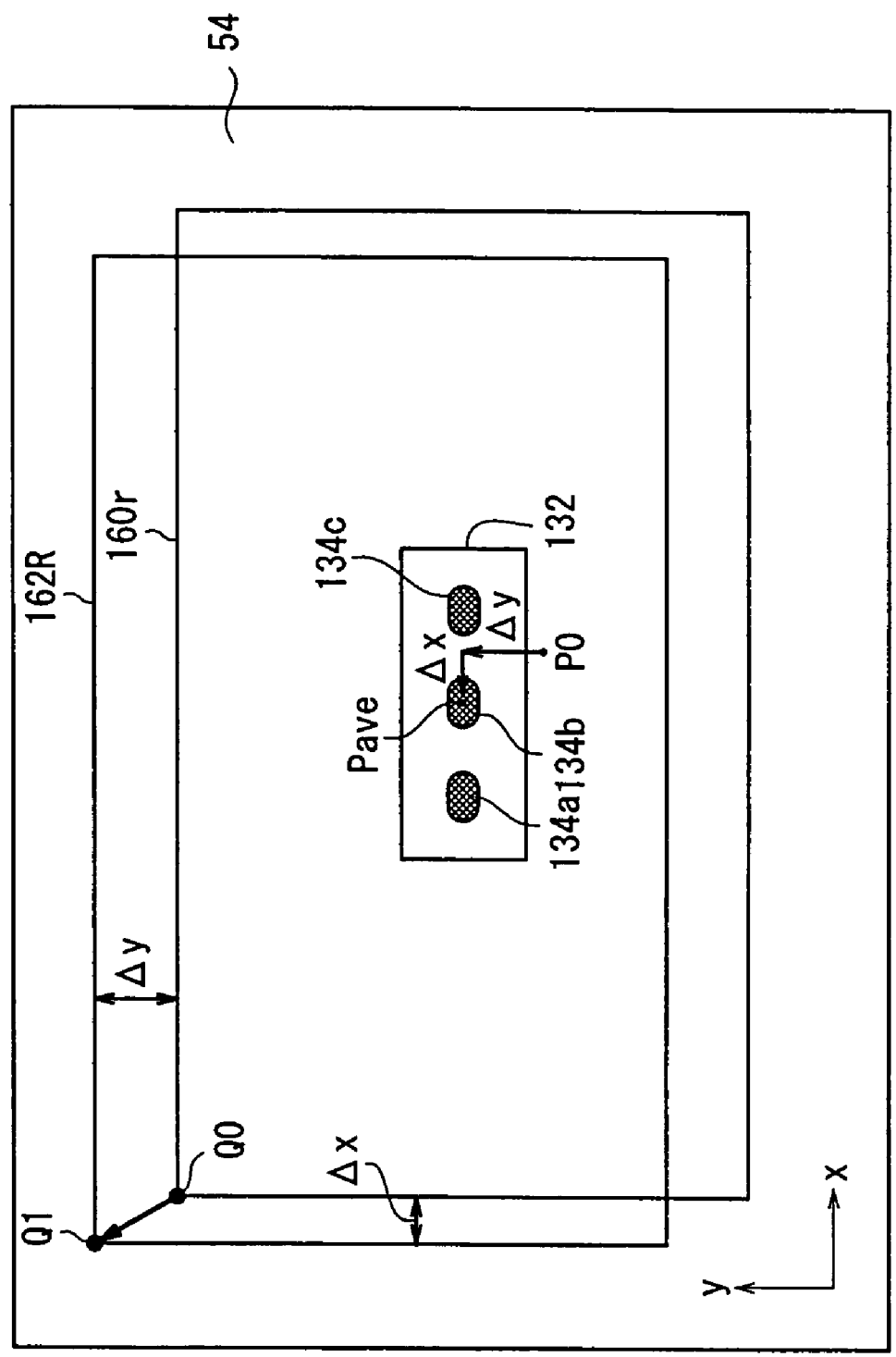
FIG. 17 is a diagram showing a process of setting a clipping area in a reference area.

In step S104, as shown in FIG. 17, a clipping area (image area) 162R is determined by moving a reference area 160R in the right gray-scale image 54 by the difference Δx in the x direction and the difference Δy in the y direction. The reference area 160R is established based on the reference coordinates P0, and is an area serving as a reference for use in image processing when the infrared camera 16R is oriented accurately forwardly. Using the clipping area 162R in image processing is as effective as using the infrared camera 16R, which is mechanically adjusted so that it is oriented accurately forwardly.

The clipping area 162R has an end point Q1 that is produced by moving an end point Q0 of the reference area 160R horizontally by the difference Δx and vertically by the difference Δy. The coordinates of the end point Q1 may be recorded on behalf of the clipping area 162R. Though not described in detail, the left gray-scale image 58 obtained by the left infrared camera 16L is similarly processed.

Then, steps S105 through S108 are carried out to perform pitch alignment adjustment for the clipping area 162R and a clipping area (image area) 162L which are established independently of each other. The pitch alignment adjustment refers to a process for relating the clipping areas 162R, 162L to achieve alignment in the pitch direction with each other based on the image of the object that is actually obtained. In the description which follows, the right gray-scale image 54 is an image obtained when the target plate 132 is placed in the right position PR, and the left gray-scale image 58 is an image obtained when the target plate 132 is placed in the left position PL. As described above, the target plate 132 is set to a constant height regardless of whether it is placed in the right position PR or the left position PL.

Figure 18:
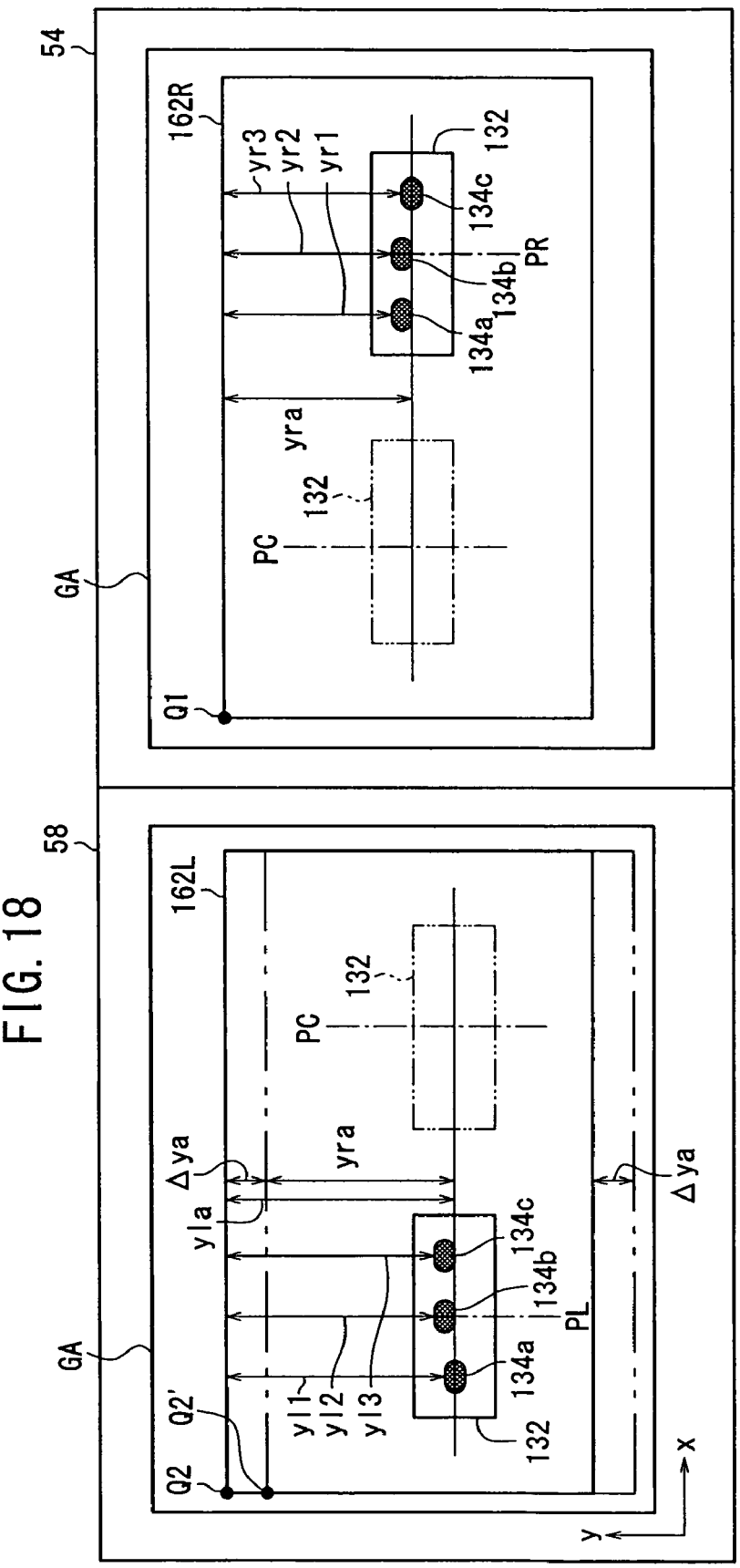
FIG. 18 is a diagram showing a pitch alignment adjusting process performed on left and right clipping areas.

In step S105, as shown in FIG. 18, y coordinates yr1, yr2, yr3 of the aiming targets 134a, 134b, 134c in the clipping area 162R extracted from the right gray-scale image 54 are determined, and an average value yra (=(yr1+yr2+yr3)/3) of the y coordinates yr1, yr2, yr3 is determined.

In step S106, y coordinates yl1, yl2, yl3 of the aiming targets 134a, 134b, 134c in the clipping area 162L extracted from the left gray-scale image 58 are determined, and an average value yla (=(yl1+yl2 +yl3)/3) of the y coordinates yl1, yl2, yl3 is determined.

In step S107, the difference Δya between the average value yra in the right clipping area 162R and the average value yla in the left clipping area 162L is determined as Δya yra−yla.

In step S108, a corrected image area is established by moving the left clipping area 162L by the difference Δya in the y direction, i.e., the pitch direction. In the example shown in FIG. 18, since yra<yla, the difference Δya is negative, the left clipping area 162L is moved downwardly, shifting an end point Q2 to an end point Q2'. The coordinates of the end point Q2' are stored on behalf of the left clipping area 162L.

Figure 19:
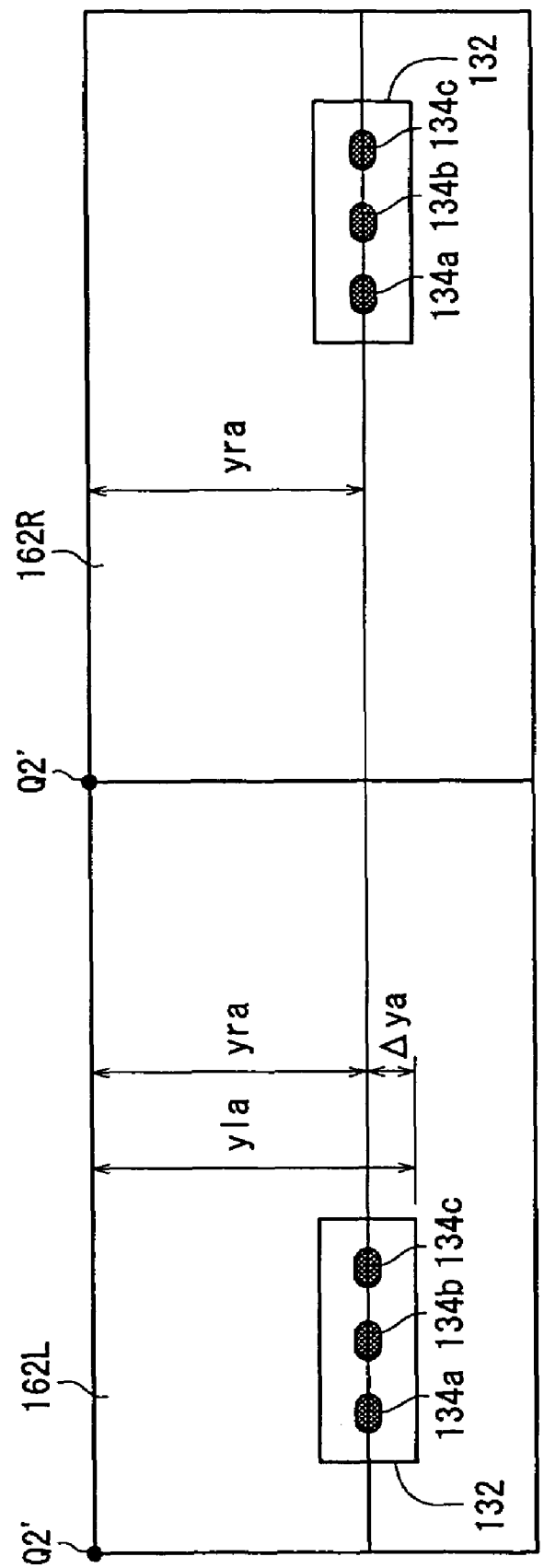
FIG. 19 is a diagram showing the positional relationship between the left and right clipping areas after the pitch alignment adjusting process has been performed thereon.

According to the pitch alignment adjustment, since the left clipping area 162L is moved with respect to the right clipping area 162R for equalizing the pitch angles based on the aiming targets 134a through 134c that are actually imaged, a distortion of the vehicle body and manufacturing errors of camera supports or stays can be compensated for. Therefore, when the clipping areas 162R, 162L are horizontally juxtaposed as shown in FIG. 19, relative y coordinates (yra in FIG. 19) in the clipping areas 162R, 162L of the obtained images of the same object are in conformity with each other.

Figure 20:
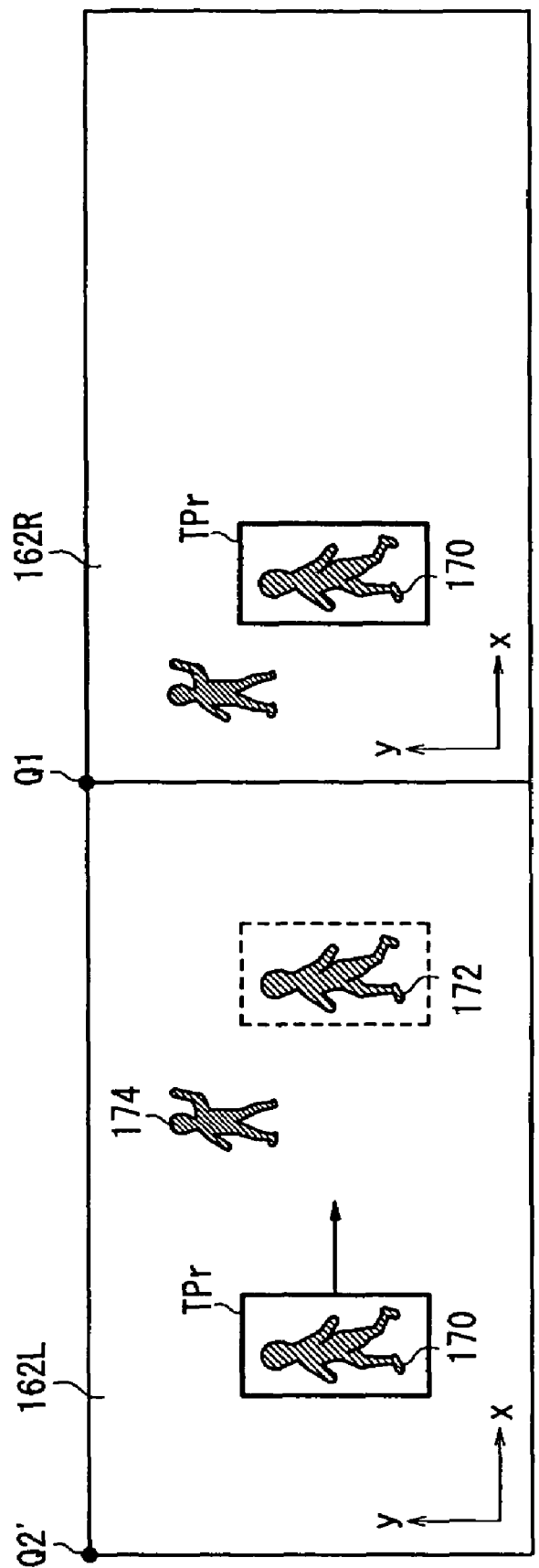
FIG. 20 is a diagram showing a template matching process in a normal mode.

As a result, a quick and reliable pattern matching process can be performed in the normal mode. Specifically, as shown in FIG. 20, a small image including an image 170 of an object which is extracted from the right clipping area 162R as a reference image is clipped as a template TPr, and placed at the same position in the left clipping area 162L as a comparison image. Then, the template TPr is moved to the right, i.e., in the positive x direction, in the left clipping area 162L, while a template matching process is being performed based on correlative calculations such as the SAD. Because the image 170 in the left clipping area 162L and a corresponding image 172 of the same object in the left clipping area 162L have the same y coordinates, the template TPr is moved a suitable distance depending on the parallax, and matches the image 172 when it reaches the broken-line position in FIG. 20. Therefore, a template match is achieved without essentially moving the template TPr in the y direction. The pattern matching process can thus be performed simply and quickly without the need for excessively widening the search area in the y direction. At this time, the SAD is very small for reliably determining whether a pattern match is achieved or not. The pattern matching process is reliable also because the template TPr does not match another image 174 which has a different y coordinate, but is similar to the image 172.

The processing sequence shown in FIG. 16 may be performed based on an image that is obtained when the target plate 132 is placed in the central position PC. For the pitch alignment adjustment, either one of the clipping areas 162R, 162L may be used as a reference, or both of the clipping areas 162R, 162L may be moved according to predetermined standards. Furthermore, inasmuch as the aiming targets 112a through 112h of the aiming target control apparatus 100 are set to the same height, the pitch alignment adjustment may be performed in the manufacturing plant aiming mode. For the pitch alignment adjustment in the manufacturing plant aiming mode, the average value yra may be determined from the right target group 116 in the right grays-scale image 54, and the average value yla may be determined from the left target group 114 in the left grays-scale image 58.

The pitch alignment adjustment may also be performed by obtaining an image of a general heat source, rather than the aiming targets 112, 134 that are to be imaged for inspection purposes. Even if the distance to and the height of the heat source are unknown, the pitch alignment adjustment can be performed by obtaining the image of the same heat source with the infrared cameras 16R, 16L.

Figure 28:
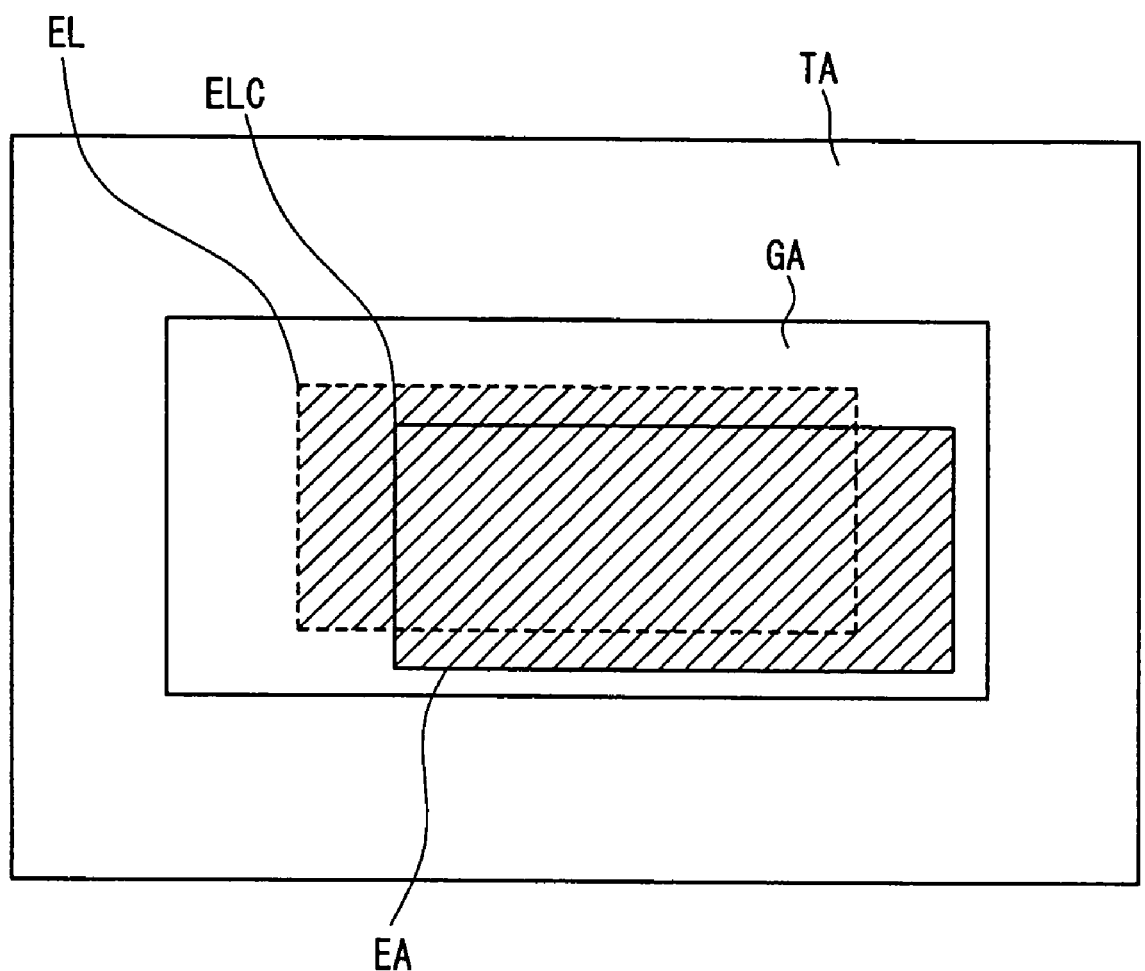
FIG. 28 is a diagram showing the corrected object detection processing area EA that is included in the given image guarantee area GA.
Figure 29:
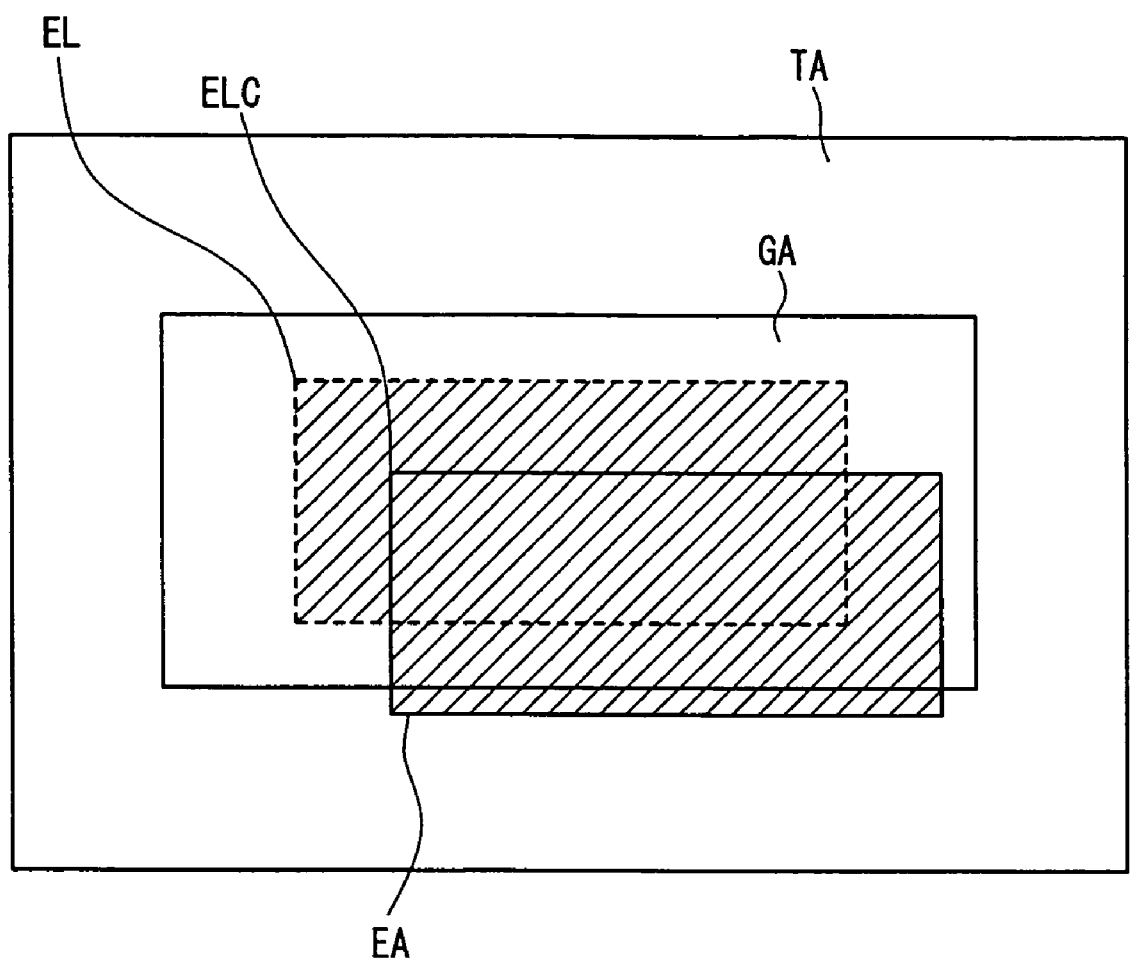
FIG. 29 is a diagram showing the corrected object detection processing area EA that deviates from the given image guarantee area GA.

When a corrected image area is established by moving the clipping area 162L by the difference Δya as shown in FIG. 18, if the corrected image area exceeds an edge of a given image guarantee area GA, then since no desired accuracy level may possibly be achieved, the informing device 21 produces a sound or an image for drawing the driver's attention, and an object detecting process is inhibited from being carried out. The informing process carried out by the informing device 21 is the same as a process which will be carried out as shown in FIGS. 28 and 29 to be described later.

A process of detecting an actual object in the normal mode after the aiming process is finished will be described below with reference to FIG. 21. The normal mode is repeatedly performed at small time intervals by the normal mode execution unit 50.

Figure 21:
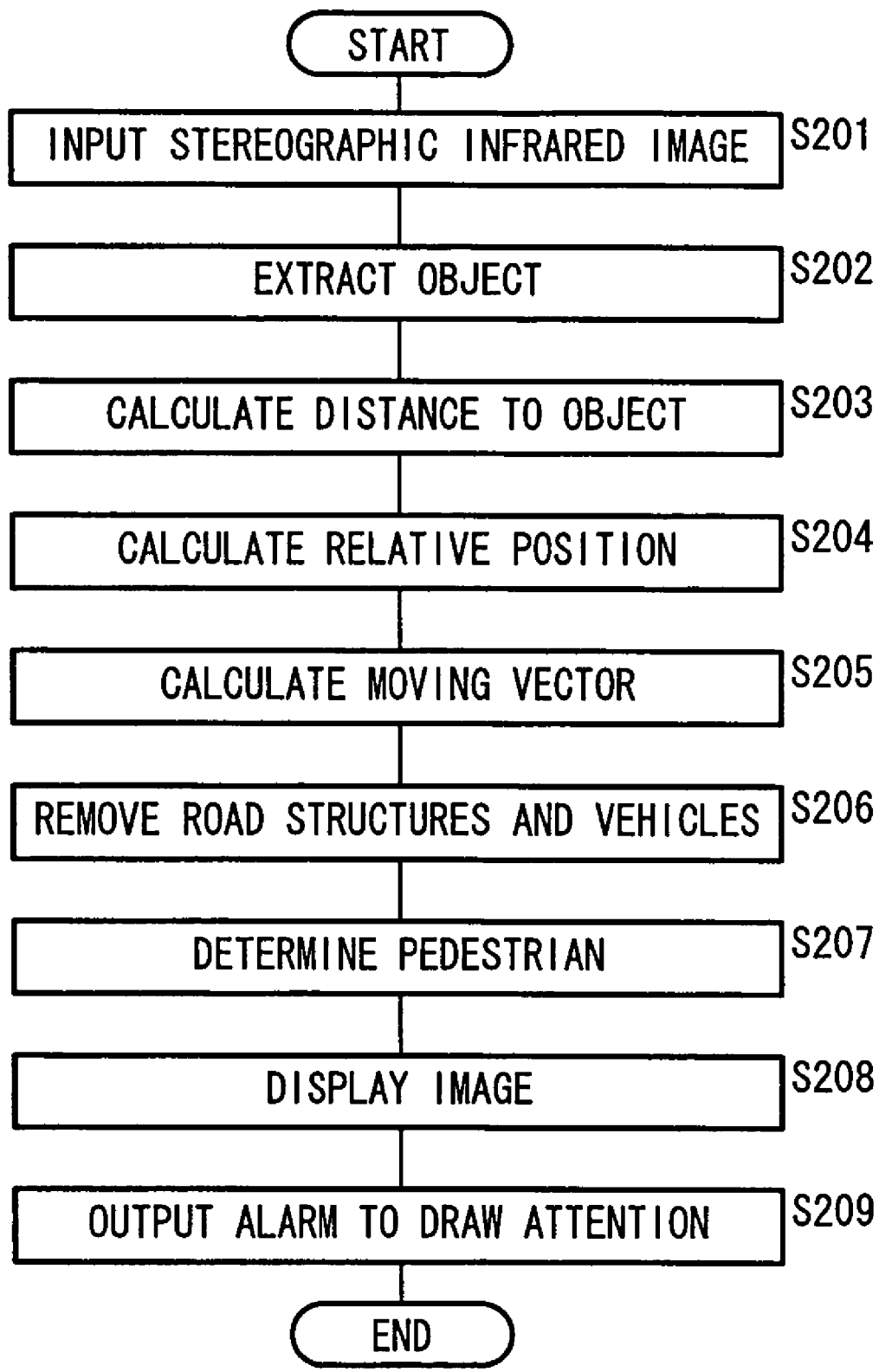
FIG. 21 is a flowchart of a processing sequence of the normal mode.

First, in step S201 shown in FIG. 21, analog stereographic infrared images are input from the infrared cameras 16R, 16L to the image input unit 40. The image input unit 40 generates the right gray-scale image 54 and the left gray-scale image 58, and the binarizer 42 generates the right binary image 56. The right gray-scale image 54, the left gray-scale image 58, and the right binary image 56 are stored in the image memory 44.

Thereafter, an object is extracted based on the right binary image 56 in step S202. The parallax between the right gray-scale image 54 and the left gray-scale image 58 is determined, and the distance up to the object is calculated from the parallax in step S203 (an object distance detecting unit). The pattern matching can quickly and reliably be performed because it is carried out on the clipping area 162R in the right gray-scale image 54 and the clipping area 162L in the left gray-scale image 58.

Then, the relative position of the object with respect to the vehicle 12 is calculated in step S204. After the calculated position is corrected based on behaviors of the vehicle 12, a moving vector of the object is calculated in step S205. At this time, the position of the actual object can accurately and quickly be detected by the ECU 14 based on the expressions (8-1) through (8-4) representing the long-distance model stored in the model memory 96.

Referring to the moving vector etc., road structures and vehicles are identified and excluded in step S206. Then, it is determined whether there is a pedestrian or not from the shape or the like of the object in step S207.

Thereafter, the right gray-scale image 54 is displayed on the HUD 18. If it is judged that there is a pedestrian within a certain range in step S207, then the image of the pedestrian is enclosed by a highlighting frame, and the speaker 20 is energized to radiate a sound to draw the driver's attention in step S209.

In the night vision system 10 according to the present embodiment, since the right clipping area 162R and the left clipping area 162L are established based on the aiming targets 112 or 134 that are actually imaged and extracted, the right clipping area 162R and the left clipping area 162L are related to each other for alignment. In the pattern matching process for removing the image of the object extracted from the right clipping area 162R as the reference image and moving the removed image in the left clipping area 162L as the comparison image, the period of time required to achieve a pattern match is reduced almost without any possibility for the image to match another object. Therefore, the pattern matching process can quickly and reliably be performed.

The night vision system 10 has a function to set an object detection processing area depending on the correction of the optical axes of the infrared cameras 16R, 16L when the optical axes are shifted from the initial state established in the above aiming process, and detect an object in a desired monitoring area around the vehicle 12.

Schematically, in this function of the night vision system 10, a parallax offset and a pan/pitch angle are calculated for the object that is identified as a road structure in step S206, based on the processed results of steps S201 through S205 in FIG. 21.

Also, this function of the night vision system 10 is performed by the normal mode execution unit 50. The function as performed by the normal mode execution unit 50 will be described below in detail with reference to FIG. 22.

Figure 22:
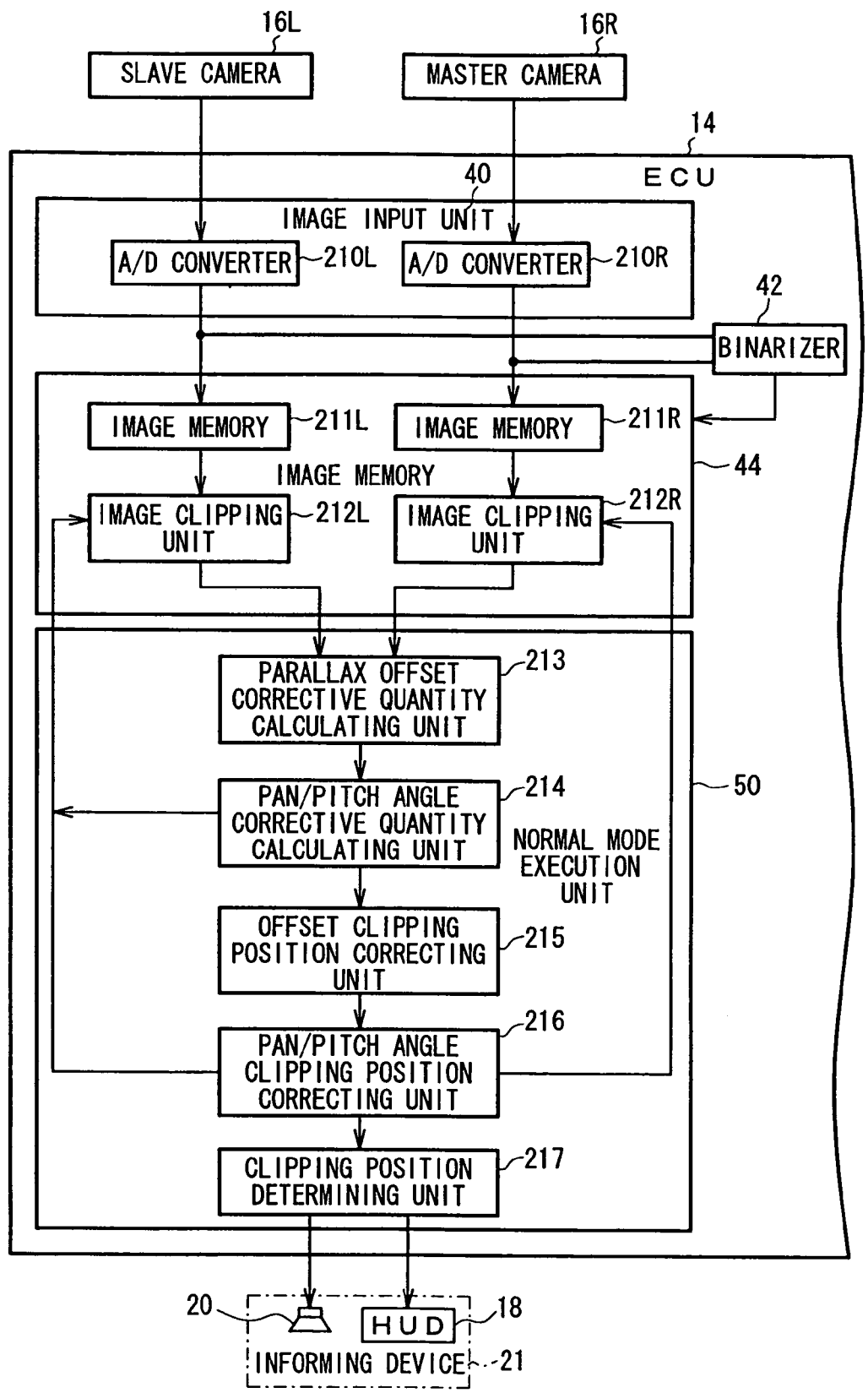
FIG. 22 is a detailed block diagram of a portion of the ECU.

As shown in FIG. 22, the normal mode execution unit 50 has a parallax offset corrective quantity calculating unit 213, a pan/pitch angle corrective quantity calculating unit 214, an offset clipping position correcting unit (an image area correcting unit) 215, a pan/pitch angle clipping position correcting unit (an image area correcting unit) 216, and an clipping position determining unit (an image guarantee range determining unit) 217. The clipping position determining unit 217 is connected to the informing device 21.

Each of the image clipping units (image area setting units) 212R, 212L sets (clips) a certain area (an object detection processing area) where an object detecting process is to be performed on an infrared image, based on a predetermined optical design (e.g., an angle of view) and installed orientations of the infrared cameras 16R, 16L. For example, each of the image clipping units 212R, 212L sets a quadrangular object detection processing area EA with an image clipping start position EL (x0, y0) representing the coordinates of the upper left corner of the object detection processing area EA, a clipping width E_W, and a clipping height E_H. The object detection processing area EA is smaller than an image guarantee area GA in a full-angle-of-view area TA in an infrared image obtained by each of the infrared cameras 16R, 16L. The image guarantee area GA is an area capable of providing a desired level of measuring accuracy for a predetermined stereographic triangular range-finding process to be performed on objects in the image guarantee area GA. In the image guarantee area GA, lens aberrations are lower than predetermined values and the percentage of a pixel loss is smaller than a predetermined value.

The coordinate system of the infrared image has its origin at the center of the infrared image, an x direction, i.e., an x-axis, which is a horizontal direction passing through the origin, and a y direction, i.e., a y-axis, which is a vertical direction passing through the origin. It is assumed that a downward vertical direction is a positive direction.

The parallax offset corrective quantity calculating unit (an optical axis shift detecting unit) 213 calculates a parallax offset corrective quantity for correcting a parallax offset d caused by a relative axis shift of the optical axes PR, PL of the cameras 16R, 16L due to differences between mounting positions and installed orientations of the cameras 16R, 16L, and calculates a position corrective quantity for correcting the image clipping start position EL (x0, y0) of the object detection processing area EA based on the parallax offset corrective quantity.

The offset clipping position correcting unit 215 corrects the position of the object detection processing area EA particularly with respect to the slave camera 16L depending on the position corrective quantity calculated by the parallax offset corrective quantity calculating unit 213.

Figure 23A:
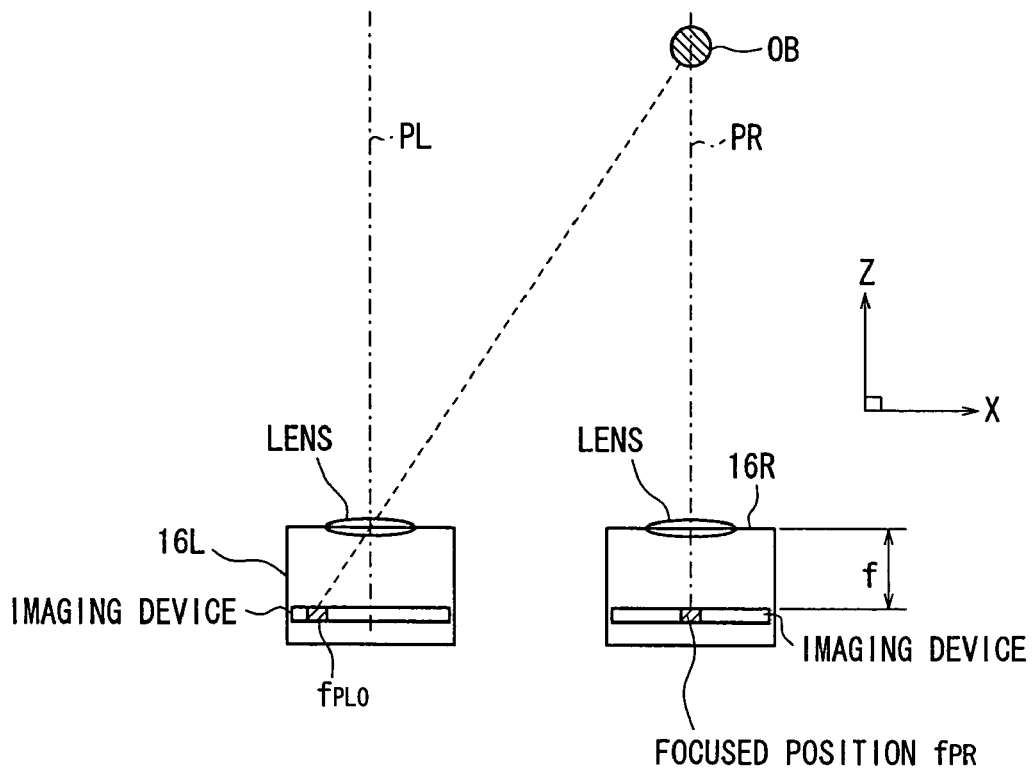
FIG. 23A is a view showing a master camera and a slave camera which have respective parallel optical axes PR, PL that are not shifted, with an object OB being present on the optical axis PR of the master camera.
Figure 23B:
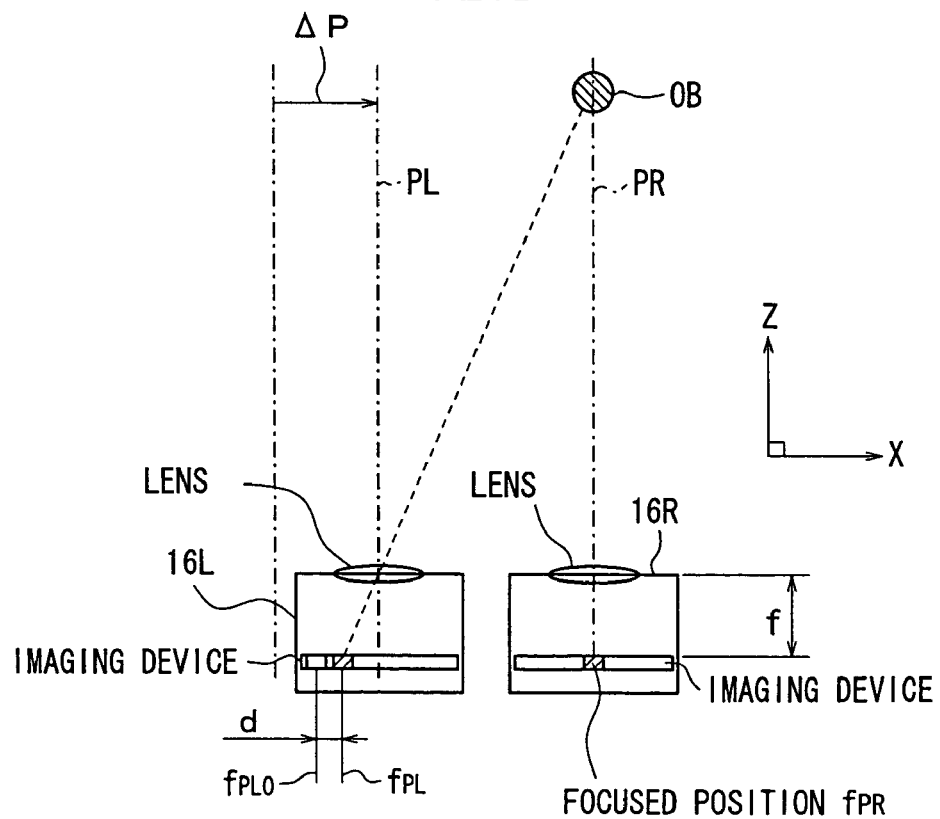
FIG. 23B is a view showing the master camera and the slave camera after the optical axis PL of the slave camera is shifted from the position shown in FIG. 23A.

For example, as shown in FIGS. 23A and 23B, when the distance between the parallel optical axes PR, PL of the master and slave cameras 16R, 16L is changed, i.e., when the optical axis PL is shifted $\Delta P$ in the positive x direction, while the object OB is being present on the optical axis PR of the master camera 16R, a parallax with parallel optical axes, which represents a change in the focused position on the imaging device of the slave camera 16L, i.e., a change from a focused position fPL0 to a focused position fPL, becomes a parallax offset d.

Figure 24:
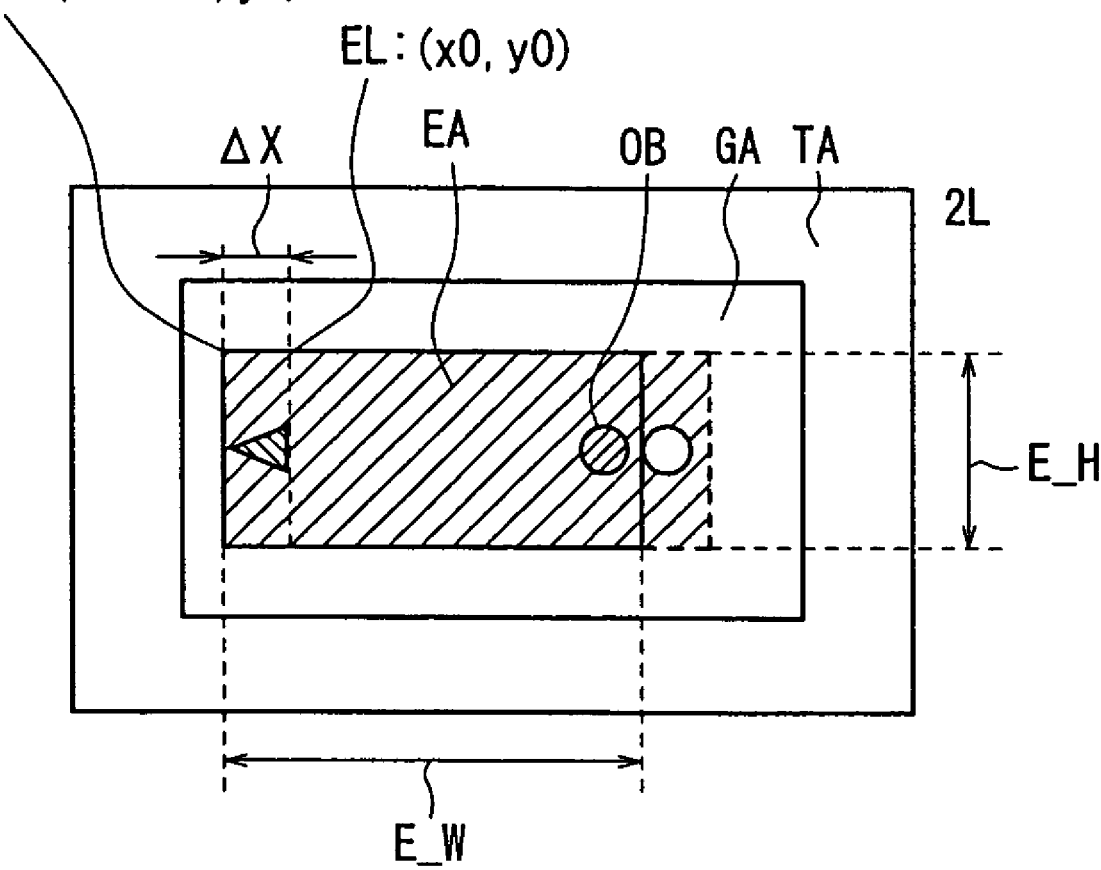
FIG. 24 is a diagram showing, by way of example, an image clipping start position EL (x0, y0) and an image clipping start corrective position ELC (x0−Δx, y0) in an object detection processing area EA that is set in a given image guarantee area GA in a full-angle-of-view area TA of the slave camera.

As shown in FIG. 24, the image clipping start position EL (x0, y0) of the object detection processing area EA in the predetermined image guarantee area GA in the full-angle-of-view area TA in the infrared image obtained by each of the cameras 16R, 16L, is corrected by a position corrective quantity (e.g., a corrective quantity $\Delta x$ in negative x direction) depending on the parallax offset d, into a corrected image clipping start position ELC (x0−$\Delta x$, y0).

When the optical axes PR, PL are shifted out of relative parallelism, a parallax caused by a relative pan angle depending on the shift in the parallelism between the optical axes PR, PL becomes a parallax offset d, for example. In this case, the parallax offset d has a value depending on the difference between a change over a given time in the distance up to a suitable still object detected by the cameras 16R, 16L while the vehicle 12 is running straight, and the distance that the vehicle 12 has traveled which is detected by a navigation system or the like in the given time. The parallax offset d has a parallax offset value $\Delta d$ when the square error E indicated by the equation (10) shown below becomes minimum. The equation (10) is defined, for example, by the camera base length, i.e., the horizontal distance D between the central positions of the imaging devices of the cameras 16R, 16L, the focal lengths of the camera, i.e., the focal length f of the lenses of the cameras 16R, 16L, the pixel pitch p, the distances L[j, i] that the vehicle 12 travels from a time i to a time j, and the parallaxes d[i], d[j] at the respective times i, j.

$$E = \sum_{i=0}^{N-1} \sum_{j=i+1}^{N} \left\{ L[j,i] - \frac{f \times D}{(d[j] - \Delta d) \times p} + \frac{f \times D}{(d[i] - \Delta d) \times p} \right\} \quad (10)$$

The pan/pitch angle corrective quantity calculating unit (a mounted state detecting unit) 214 calculates a pan angle representing a horizontal shift of each of the optical axes PR, PL of the cameras 16R, 16L with respect to the direction in which the vehicle 12 travels, due to differences between mounting positions and installed orientations of the cameras 16R, 16L, and a pitch angle representing a vertical shift, caused by a pitching motion of the vehicle 12, of each of the optical axes PR, PL of the cameras 16R, 16L with respect to the direction in which the vehicle 12 travels. Then, the pan/pitch angle corrective quantity calculating unit 214 calculates a position corrective quantity for correcting the image clipping start position EL (x0, y0) of the object detection processing area EA based on the pan angle and the pitch angle of each of the cameras 16R, 16L.

The pan/pitch angle clipping position correcting unit 216 corrects the position of the object detection processing area EA with respect to each of the cameras 16R, 16L depending on the position corrective quantity calculated for each of the cameras 16R, 16L by the pan/pitch angle corrective quantity calculating unit 214.

For example, the pan/pitch angle corrective quantity calculating unit 214 calculates an approximate straight line LMV which approximates the relative trajectory of a still object detected in the obtained infrared image. In a camera coordinate system (Xc, Yc, Zc) based on the optical axes PR, PL of the cameras 16R, 16L, the pan/pitch angle corrective quantity calculating unit 214 uses, as a pan angle φ, the angle formed between the approximate straight line LMV as projected onto the Xc-Zc plane and the Zc-axis, and also uses, as a pitch angle θ, the angle formed between the approximate straight line LMV as projected onto the Yc-Zc plane and the Zc-axis.

The camera coordinate system (Xc, Yc, Zc) is calculated according to the equations (11) shown below. The camera coordinate system (Xc, Yc, Zc) has its origin O at the midpoint between the mounted positions of the cameras 16R, 16L on the front end of the vehicle 12, an x direction, i.e., an x-axis, which is a horizontal direction passing through the origin O, and a y direction, i.e., a y-axis, which is a vertical direction passing through the origin O. Coordinates (xc, yc) are produced by transforming coordinates (x, y) in a reference image, e.g., a right image, into coordinates in a hypothetical image that is obtained by aligning the origin O in the actual space with the center of the image data based on the relative positional relationship between the mounted position of the master camera 16R and the origin O in the actual space. In the equations (11) shown below, the distance between the vehicle 12 and the object, i.e., the distance (object distance) z (m) between the lenses of the cameras 16R, 16L and the object, is calculated based on the camera base length, i.e., the horizontal distance D (m) between the central positions of the imaging devices of the cameras 16R, 16L, the focal lengths f (m) of the camera, i.e., the focal length f (m) of the lenses of the cameras 16R, 16L, the pixel pitch p (m/pixel), and the parallax Δd (pixel) represented by a number of pixels.

$$\begin{bmatrix} Xc \\ Yc \\ Zc \end{bmatrix} = \begin{bmatrix} xc \times Z/F \\ yc \times Z/F \\ z \end{bmatrix} \quad (11)$$

$$z = \frac{f \times D}{\Delta d \times p}$$

$$F = \frac{f}{p}$$

Figure 25A:
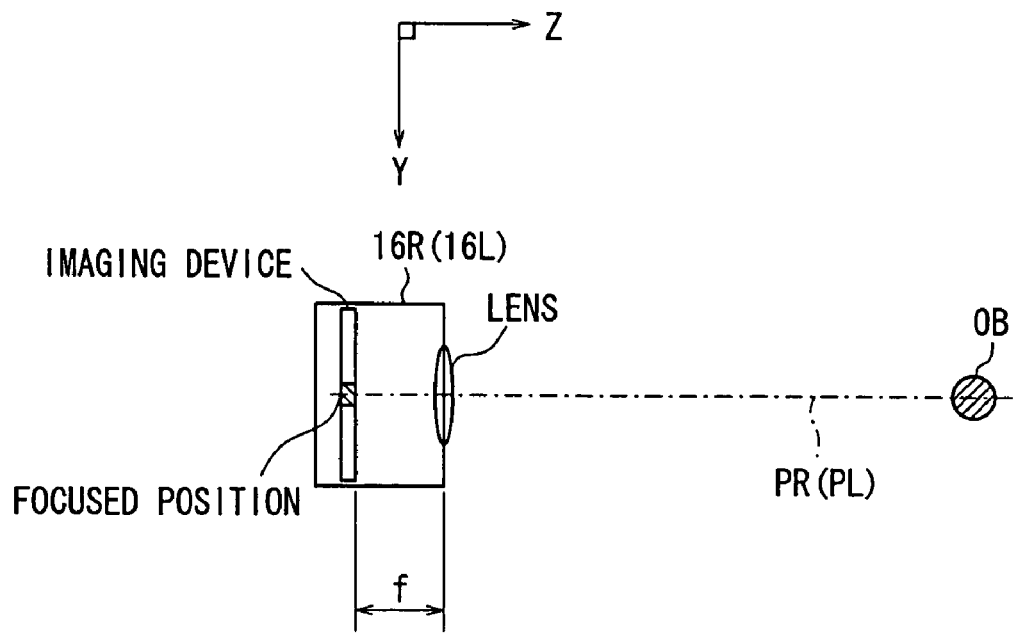
FIG. 25A is a diagram showing the master camera and the object OB that is present on the optical axis PR of the master camera.
Figure 25B:
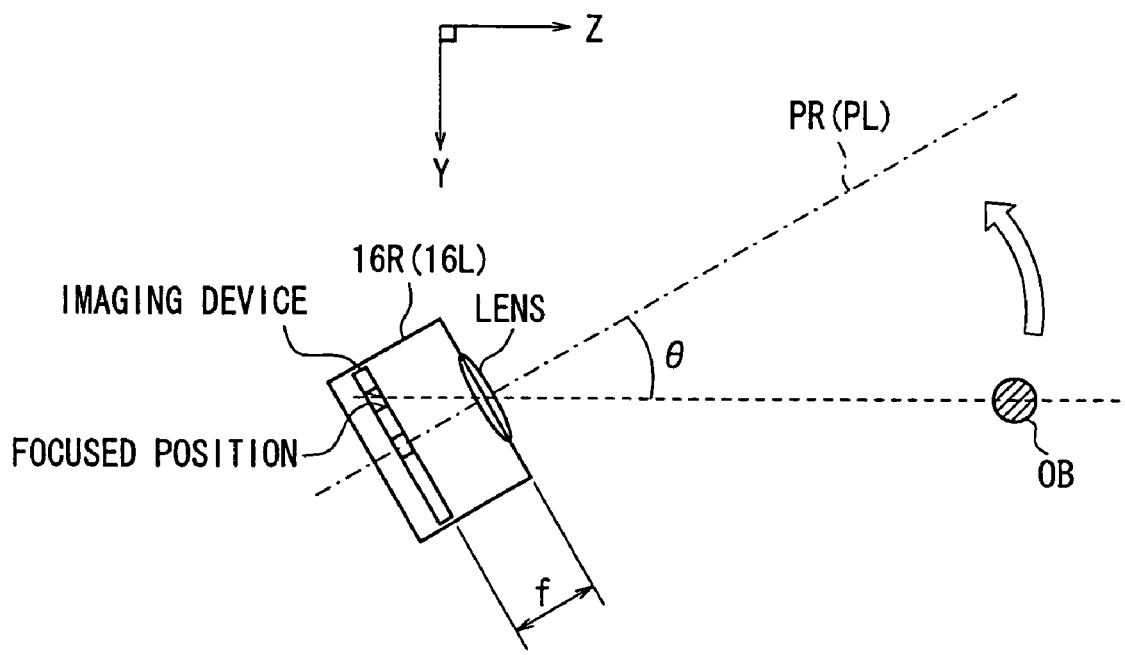
FIG. 25B is a diagram showing the optical axes PR, PL that are shifted a pitch angle θ when they are tilted upwardly from the position shown in FIG. 25A.
Figure 26:
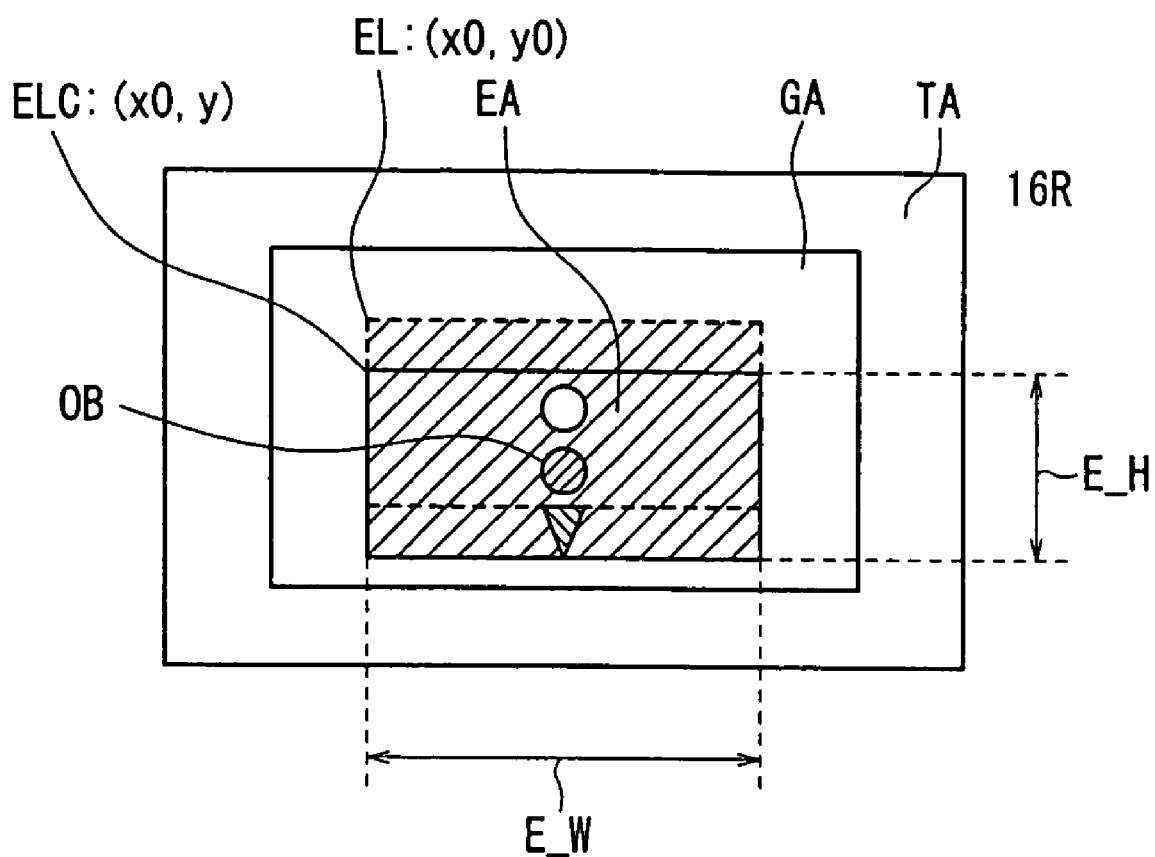
FIG. 26 is a diagram showing, by way of example, an image clipping start position EL (x0, y0) and an image clipping start corrective position ELC (x0, y) in an object detection processing area EA that is set in a given image guarantee area GA in a full-angle-of-view area TA of each of the cameras in an infrared image obtained by the master camera.
Figure 27:
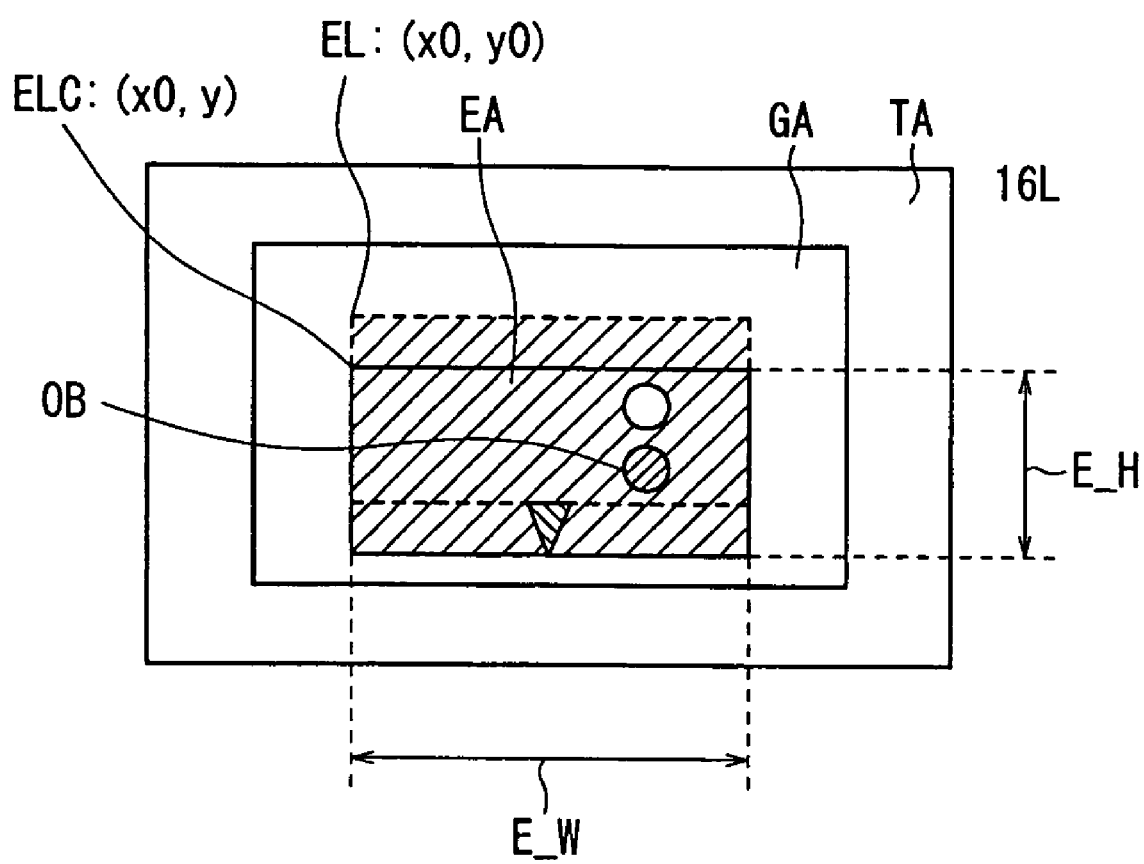
FIG. 27 is a diagram showing, by way of example, an image clipping start position EL (x0, y0) and an image clipping start corrective position ELC (x0, y) in an object detection processing area EA that is set in a given image guarantee area GA in a full-angle-of-view area TA of each of the cameras in an infrared image obtained by the slave camera.

For example, as shown in FIGS. 25A and 25B, when the optical axes PR, PL of the cameras 16R, 16L are shifted a pitch angle θ by tilting upwardly from the position shown in FIG. 25A while the object OB is being present on the optical axis PR of the master camera 16R, the image clipping start position EL (x0, y0) of the object detection processing area EA in the image guarantee area GA in the full-angle-of-view area TA in the infrared image obtained by each of the cameras 16R, 16L, is corrected by a position corrective quantity depending on the pitch angle θ into a corrected image clipping start position ELC (x0, y), as indicated by the following equation (12) (see also FIGS. 26 and 27):

$$y = y0 + \left( \frac{f \times \tan\theta}{p} \right) \quad (12)$$

The clipping position determining unit 217 determines whether the object detection processing area EA positionally corrected by the offset clipping position correcting unit 215 or the pan/pitch angle clipping position correcting unit 216 is included in the image guarantee area GA in the full-angle-of-view area TA in the infrared image obtained by each of the infrared cameras 16R, 16L or not. If the answer to "YES" as shown in FIG. 28, then a predetermined object detecting process is performed on the corrected object detection processing area EA. If the answer is "NO" as shown in FIG. 29, then the informing device 21 controls the speaker 20 to produce an audible alarm such as an alarming sound or voice and also controls the HUD 18 to produce a visual alarm such as an alarming display image, and an object detecting process is inhibited from being performed on the corrected object detection processing area EA.

With the night vision system 10 according to the present embodiment, as described above, the position of the object detection processing area EA in the infrared image obtained by each of the cameras 16R, 16L is corrected depending on the position corrective quantity calculated by the parallax offset corrective quantity calculating unit 213 and the position corrective quantity calculated for each of the cameras 16R, 16L by the pan/pitch angle corrective quantity calculating unit 214. Therefore, the object detection processing area EA can appropriately be established depending on the correction of the optical axes PR, PL of the cameras 16R, 16L for properly detecting an object in a desired monitoring range around the vehicle 12.

If the corrective quantity for the object detection processing area EA is so excessive that the object detection processing area EA exceeds the image guarantee area GA, making the data in the object detection processing area EA much less reliable, then an alarm is issued and an object detecting process is inhibited from being performed. Consequently, the occupants of the vehicle or the operator engaging in the aiming process is able to recognize the reliability of the data produced by the object detecting process, and the data of excessively low reliability are prevented from being presented to the occupants of the vehicle or the operator engaging in the aiming process.

The night vision system 10 may have three or more infrared cameras as imaging units, rather than two infrared cameras, with one of the infrared cameras being used to generate a reference image and the other infrared cameras to generate comparison images.

Although a certain preferred embodiment of the present invention has been shown and described in detail, it should be understood that various changes and modifications may be made therein without departing from the scope of the appended claims.

What is claimed is:

1. A vehicle vicinity monitoring apparatus for detecting a position of an object in the vicinity of a vehicle from images obtained by a plurality of imaging units that are aligned in parallel with a width direction of the vehicle and mounted on a front part of said vehicle, comprising:
   an image area setting unit for setting an image area to a predetermined area in each of the images obtained by said imaging units, the image area being used to detect an object therefrom, which is disposed in front of the imaging units;
   an object extracting unit for detecting an object in the image area set by said image area setting unit;
   an image area correcting unit for vertically correcting, based on information with respect to the object detected by said object extracting unit of one of the imaging units, the image areas set by said image area setting units of the rest of the imaging units;
   an optical axis shift detecting unit for detecting a shift of optical axes of said imaging units; and
   a mounted state detecting unit for detecting mounted states of said imaging units on the vehicle;
   wherein said image area correcting unit corrects the image area set by said image area setting unit based on the shift of the optical axes detected by said optical axis shift detecting unit and the mounted states detected by said mounted state detecting unit.

2. A vehicle vicinity monitoring apparatus according to claim 1, wherein said object extracting unit detects an object in each of image areas set by said image area setting unit.

3. A vehicle vicinity monitoring apparatus according to claim 1, further comprising:
   an image guarantee area determining unit for determining whether said image area corrected by said image area correcting unit exceeds a predetermined image guarantee area of said imaging units or not; and
   an informing unit for outputting an alarm if it is judged by said image guarantee area determining unit that said image area corrected by said image area correcting unit exceeds said predetermined image guarantee area.

4. A vehicle vicinity monitoring apparatus according to claim 1, wherein the object is specified according to a pattern matching process based on a reference image and a comparison image obtained by the imaging units.

5. A vehicle vicinity monitoring apparatus for extracting an object in the vicinity of a vehicle from images obtained by a plurality of imaging units mounted on said vehicle, comprising:
   an image area setting unit for setting an image area used to detect an object therefrom in each of the images obtained by said imaging units;
   an object extracting unit for detecting an object in the image area set by said image area setting unit; and
   an image area correcting unit for correcting the image area set by said image area setting unit based on information with respect to the object detected by said object extracting unit;
   wherein said imaging units comprise:
   a first imaging unit for obtaining a first image of said object and a second imaging unit for obtaining a second image of said object;
   wherein said object extracting unit extracts said object from each of said first image and said second image; and
   wherein said image area setting unit sets a first image area and a second image area respectively in said first image and said second image as areas for detecting said object obtained by said first imaging unit and said second imaging unit according to a pattern matching process, and sets said first image area and said second image area based on the position of said object extracted by said object extracting unit so as to equalize coordinates of the said object in a direction perpendicular to a hypothetical plane including optical axes of said first imaging unit and said second imaging unit.

6. A vehicle vicinity monitoring apparatus according to claim 5, wherein said first imaging unit obtains a first target as the first image of said object and said second imaging unit obtains a second target as the second image of said object at the same height as said first target, and said image area setting unit sets said first image area and said second image area based on the difference between coordinates, in said direction perpendicular to said hypothetical plane, of said first target as said first image and said second target as said second image.

7. A vehicle vicinity monitoring apparatus according to claim 5, wherein said imaging units comprise at least three imaging units, one of said imaging units serving as said first imaging unit, and the remaining imaging units as said second imaging units.

8. A vehicle vicinity monitoring apparatus for extracting an object in the vicinity of a vehicle from images obtained by a plurality of imaging units mounted on said vehicle, comprising:
   an image area setting unit for setting an image area used to detect an object therefrom in each of the images obtained by said imaging units;
   an optical axis shift detecting unit for detecting a shift of optical axes of said imaging units;
   a mounted state detecting unit for detecting at least one of a pan angle and a pitch angle of each optical axis of each imaging unit, as mounted states of said imaging units on the vehicle; and
   an image area correcting unit for correcting the image area set by said image area setting unit based on information detected by said optical axis shift detecting unit and information detected by the mounted state detecting unit;
   wherein
   the optical axis shift detecting unit detects the shift in parallelism between the optical axes, based on a difference between a change over a given time in a distance up to a still object detected by each imaging unit while the vehicle is in a predetermined running state and a distance that the vehicle has traveled in the given time; and
   the mounted state detecting unit detects at least one of the pan angle and the pitch angle of each optical axis of each imaging unit, based on a straight line obtained by projecting a relative trajectory of the still object detected by each imaging unit on a coordinate system having its origin at the optical axis of each imaging unit.

9. A vehicle vicinity monitoring apparatus according to claim 8, wherein the object is specified according to a pattern matching process based on a reference image and a comparison image obtained by the imaging units.

* * * * *

UNITED STATES PATENT AND TRADEMARK OFFICE
CERTIFICATE OF CORRECTION

PATENT NO. : 7,599,521 B2  
APPLICATION NO. : 11/287555  
DATED : October 6, 2009  
INVENTOR(S) : Watanabe et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this

Fourteenth Day of December, 2010

David J. Kappos  
*Director of the United States Patent and Trademark Office*